(12) United States Patent
Woolbright

(10) Patent No.: US 12,178,168 B2
(45) Date of Patent: Dec. 31, 2024

(54) VERTICAL GROWING SYSTEM

(71) Applicant: Greenwall Ventures, LLC, St. Louis, MO (US)

(72) Inventor: Mark Woolbright, St. Louis, MO (US)

(73) Assignee: Greenwall Ventures, LLC, St. Louis, MO (US)

( * ) Notice: Subject to any disclaimer, the term of this patent is extended or adjusted under 35 U.S.C. 154(b) by 239 days.

(21) Appl. No.: 17/595,791

(22) PCT Filed: May 30, 2020

(86) PCT No.: PCT/US2020/035457
§ 371 (c)(1),
(2) Date: Nov. 24, 2021

(87) PCT Pub. No.: WO2020/243672
PCT Pub. Date: Dec. 3, 2020

(65) Prior Publication Data
US 2022/0322611 A1 Oct. 13, 2022

Related U.S. Application Data

(60) Provisional application No. 62/855,149, filed on May 31, 2019.

(51) Int. Cl.
*A01G 9/02* (2018.01)
(52) U.S. Cl.
CPC .................................. *A01G 9/023* (2013.01)
(58) Field of Classification Search
CPC ........ A01G 9/022; A01G 9/023; A01G 9/025; A47G 7/02; A47G 7/04; A47G 7/041; A47G 7/042

(Continued)

(56) References Cited

U.S. PATENT DOCUMENTS 6,164,537 A 12/2000 Mariani et al.
10,701,870 B2 * 7/2020 Zhou ...................... A01G 9/025
(Continued)

FOREIGN PATENT DOCUMENTS

CN 1973606 A * 6/2007 ............ A01G 1/007
KR 200327215 Y1 * 9/2003
(Continued)

OTHER PUBLICATIONS

International Search Report and Written Opinion of the International Searching Authority issued in PCT/US2020/035457, mailed Sep. 2, 2020, pp. 1-16.

*Primary Examiner* — Tien Q Dinh
*Assistant Examiner* — Erica Michelle Huebner
(74) *Attorney, Agent, or Firm* — Armstrong Teasdale LLP

(57) ABSTRACT

A vertical growing system includes a frame assembly extending above a base surface, the frame assembly includes a support grid defining a longitudinal axis. The system further includes a propagation tray having a chamber for holding a plant therein and a mounting tray. The mounting tray is removably attached to the frame assembly and includes an interior surface sized to receive at least a portion of the propagation tray therein. The system further includes a positioning member sized to extend from the interior surface of the mounting tray to the propagation tray when the propagation tray is received within the mounting tray. The positioning member is shaped to orient the chamber at a first oblique angle relative to the longitudinal axis of the support grid.

16 Claims, 34 Drawing Sheets

(58) Field of Classification Search
USPC .......................................................... 47/82, 83
See application file for complete search history.

(56) References Cited

U.S. PATENT DOCUMENTS

| | | | |
|---|---|---|---|
| 10,897,855 B2 * | 1/2021 | Calle | ..................... A01G 9/025 |
| 2009/0231110 A1 | 9/2009 | Hyde et al. | |
| 2010/0146855 A1 * | 6/2010 | Ma | ........................ A01G 9/025 47/82 |
| 2011/0036008 A1 | 2/2011 | Hashimoto et al. | |
| 2015/0282433 A1 | 10/2015 | Legerton | |
| 2015/0347544 A1 | 12/2015 | Caraballoso et al. | |
| 2016/0262316 A1 * | 9/2016 | Woolbright | ............ A01G 9/025 |

FOREIGN PATENT DOCUMENTS

| | | | |
|---|---|---|---|
| KR | 200479346 Y1 * | 1/2016 | |
| KR | 20170061483 A * | 6/2017 | |
| WO | WO-2014100854 A1 * | 7/2014 | ............ A01G 9/025 |

* cited by examiner

VERTICAL GROWING SYSTEM

CROSS-REFERENCE TO RELATED APPLICATION

This application is a National Stage application of International Application No. PCT/US2020/035457 filed on May 30, 2020. International Application No. PCT/US2020/035457 claims priority to U.S. Provisional Patent Application Ser. No. 62/855,149 filed 31 May 2019, both of which are hereby incorporated by reference in their entireties.

BACKGROUND

The present invention relates generally to growing systems and more particularly to vertical growing systems configured to facilitate vertical plant growth and methods for configuring such vertical growing systems.

Typically, vertical growing systems include trays that are sized to hold soil deposits therein. For example, at least some known vertical growing systems include trays attached to a vertically extending support structure and containing soil loosely deposited within the tray. However, such trays, having soil loosely deposited therein, are susceptible to soil loss from the tray. Accordingly, at least some known vertical growing systems provide soil within a liquid and vapor permeable mesh bag or sock. In particular, in at least some such systems, soil is contained within the mesh bag or sock and placed within a tray mounted to the support structure, as described, for example, in U.S. Patent Application Publication No. 2016/0262316, which is hereby incorporated by reference in its entirety.

However, in the above described systems, replacing the plants and/or soil within the trays, after the trays have been mounted to the support structures, can be difficult or costly. For example, replacing the plant growth in trays having loosely deposited soil often requires detaching the tray from the vertical growing system, removing the present plants and/or soil within the tray, refilling the tray with the new desired plants or soil, and remounting the tray to the support structure. Moreover, the mesh bag or socks may be heavy and cumbersome to move. Accordingly, for some embodiments including mesh bags or socks, special machinery may be required to lift the mesh bags or socks from the trays.

Some systems for containing plant growth are more easily portable and interchangeable. For example, the propagation systems sold under the trademark ELLEPOT, generally include a propagation paper wrapped around soil and/or other propagation media (i.e., an ELLEPOT container). The ELLEPOT container may then be placed in an ELLEPOT tray which is sized to facilitate air flow through the soil and/or other propagation media of the ELLEPOT container. However, at least some known vertical growing systems are not well-suited for mounting ELLEPOT trays.

Therefore, there is a need for a cost effective and easy to use vertical growing system that facilitates easy replacement of plants or soil on the vertical growing system.

SUMMARY

In one embodiment, a vertical growing system generally comprises a frame assembly extending above a base surface. The frame assembly includes a support grid defining a longitudinal axis. The system further includes a propagation tray having a chamber for holding a plant therein and a mounting tray. The mounting tray is removably attached to the frame assembly and includes an interior surface sized to receive at least a portion of the propagation tray therein. The system further includes a positioning member sized to extend from the interior surface of the mounting tray to the propagation tray when the propagation tray is received within the mounting tray. The positioning member is shaped to orient the chamber at a first oblique angle relative to the longitudinal axis of the support grid.

In another embodiment, a vertical growing system generally comprises a frame assembly extending above a base surface. The frame assembly includes a support grid defining a longitudinal axis, the support grid including a first support member and a second support member. The first and second support members are each transversely oriented relative to the longitudinal axis. The system further includes a plurality of mounting trays removably attached to frame assembly above the base surface, the plurality of mounting trays being arranged in a plurality of vertically stacked rows along the support grid. A first mounting tray of the plurality of mounting trays includes an interior surface and a positioning member extending from the interior surface, the positioning member oriented at a first oblique angle relative to the longitudinal axis. The system further includes a plurality of propagation trays each including a first chamber configured for supporting a plant therein. The first chamber of a first propagation of the plurality of propagation trays is received within the first mounting tray such that the positioning member engages the first propagation tray to orient the first chamber of the first propagation tray at a second oblique angle relative to the longitudinal axis.

In yet another embodiment, a method of assembling a vertical growing system generally comprises positioning a frame assembly to extend above a base surface, the frame assembly including a support grid defining a longitudinal axis. The method further includes providing a mounting tray including an interior surface sized to receive at least a portion of a propagation tray therein and attaching the mounting tray to the frame assembly. The method further includes providing a propagation tray including a chamber for holding a plant therein and positioning the propagation tray, at least in part, within the mounting tray such that a positioning member extends from the interior surface of the mounting tray to the propagation tray. The positioning member orienting a chamber of the propagation tray at a first oblique angle relative to the longitudinal axis, when the mounting tray is attached to the frame assembly and the propagation tray is positioned within the mounting tray.

In yet another embodiment, a method of updating the configuration of a vertical growing system is provided. The method includes receiving a request for an updated configuration of a vertical growing system. The method further includes retrieving a first configuration of the vertical growing system from a database, wherein the first configuration includes a first set of propagation trays and retrieving an inventory listing of propagation tray from the database. The method further includes generating, based on the inventory listing, a second configuration of the vertical growing system from a database, wherein the second configuration includes a second set of propagation trays. The method further includes removing at least one propagation tray of the first set of propagation trays from mounting trays of the vertical growing system and installing at least one propagation tray of the second set of propagation trays into the mounting trays of the vertical growing system.

In yet another embodiment, a computing device is provided. The computing device includes a processor and a memory in communication with the processor. The processor is programmed to receive a request for an updated configuration of a vertical growing system and retrieve a first configuration of the vertical growing system from a database, wherein the first configuration includes a first set of propagation trays. The processor is further programmed to retrieve an inventory listing of propagation trays from the database and generate, based on the inventory listing, a second configuration of the vertical growing system from a database, wherein the second configuration includes a second set of propagation trays. The processor is further programmed to generate an order including instructions to remove at last one propagation tray of the first set of propagation trays from mounting trays of the vertical growing system and install at least one propagation tray of the second set of propagation trays into the mounting trays of the vertical growing system.

BRIEF DESCRIPTION

Corresponding reference characters indicate corresponding parts throughout the several views of the drawings.

DETAILED DESCRIPTION

Figure 1:
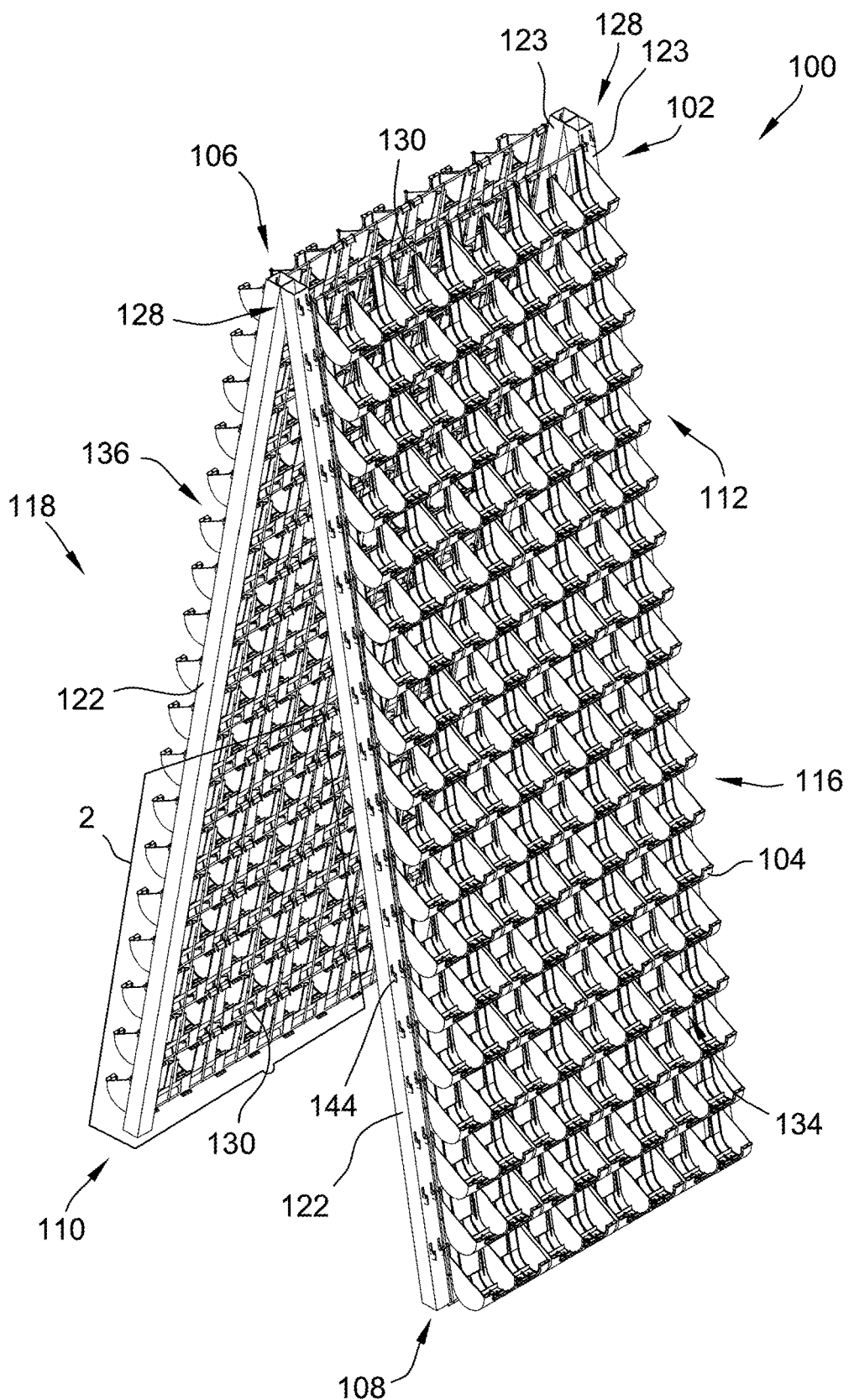
FIG. 1 is a perspective view of one suitable embodiment of a vertical growing system of the present disclosure.

Referring now to the drawings and in particular to FIGS. 1-13, a vertical growing system according to one suitable embodiment of the present disclosure is indicated generally by reference numeral 100. It is understood, however, that other suitable embodiments of the vertical growing system 100 are also contemplated without departing from the scope of this disclosure.

As best seen in FIG. 1, the illustrated vertical growing system 100 comprises a frame assembly, indicated generally at 102, and a plurality of mounting trays 104 removably attached to the frame assembly 102. The frame assembly 102 includes a top, generally indicated at 106, a bottom, generally indicated at 108, opposite the top 106, a first side (the left side as viewed in FIG. 1), generally indicated at 110, extending from the top 106 to the bottom 108, and a second side (the right side as viewed in FIG. 1), generally indicated at 112, opposite the first side.

In the illustrated embodiment, the frame assembly 102 includes a first panel, indicated generally at 116, and a second panel, indicated generally at 118. The first panel 116 includes a first strut 122, a second strut 123 and a wire grid 130, or more broadly, a support grid, extending between the first strut 122 and the second strut 123. The second panel 118 includes a first strut 122, a second strut 123, and a wire grid 130 extending between the first strut 122 and the second strut 123. In the illustrated embodiment, the first and second struts 122, 123 of the first and second panels 116, 118 are each elongated rectangular tubes. In other suitable embodiments, the struts 122, 123 may have any shape that enables the struts 122, 123 to function as described herein. In the illustrated embodiment, the wire grids 130 are formed of an elongated metal or metal-based material. In other suitable embodiments, the wire grids 130 may be formed of any material that enables the wire grids 130 to function as described herein.

In yet other suitable embodiments, the frame assembly 102 includes any number of struts 122, 123 that enable the frame assembly 102 to function as described herein. For example, and without limitation, in some alternative embodiments, the first panel 116 and the second panel 118 each include a third strut (not shown) positioned between the first and second struts 122, 123 of each of the panels to provide additional support for the frame assembly 102.

In the illustrated embodiment, the first panel 116 and the second panel 118 each extend from the bottom 108 of the frame assembly 102 to the top 106 of the frame assembly 102. In particular, referring to FIG. 3, in the illustrated embodiment, the frame assembly 102 is positioned on a base surface 120. The base surface 120 may be for example, and without limitation, a tile, concrete, stone, or hardwood surface. In other suitable embodiments, the frame assembly 102 may be positioned on any suitable base surface 120 that enables the vertical growing system 100 to function as described herein. In yet further embodiments, the frame assembly 102 is not positioned on a base surface 120 but instead may be mounted to a vertical surface. The frame assembly 102 is configured to support the mounting trays 104 above the base surface 120. In particular, the frame assembly 102 is configured to support the mounting trays 104, at least in part, in a vertically stacked configuration relative to one another.

In the illustrated embodiment, the first panel 116 and the second panel 118 are arranged relative to one another such that the frame assembly 102 is generally arranged in an "A" formation. More specifically, with reference to FIG. 4, the struts 122, 123 of the frame assembly 102 are each sized and shaped to be oriented at an oblique angle, generally indicated at β, relative to the base surface 120. That is, each of the struts 122, 123 includes a bottom surface 124, a body 126, and a top, indicated generally at 128. The bodies 126 of the struts 122, 123 each extend at the oblique angle p from the bottom surfaces 124 to the tops 128 of the struts 122, 123. In other suitable embodiments, the struts 122, 123 of the frame assembly 102 may be oriented at any β relative to the base surface 120 that enables the frame assembly 102 to function as described herein. For example, and without limitation, in some suitable embodiments, the struts 122, 123 of the frame assembly 102 are oriented at 90 degrees relative to the base surface 120.

As best seen in FIG. 1, in the illustrated embodiment, the first panel 116 is fixedly attached to the second panel 118 at the tops 128 of the struts 122, 123. In particular, the first panel 116 and the second panel 118 are attached such that the struts 122, 123 of each panel 116, 118 structurally support one another to facilitate positioning the panels 116, 118 in an upright position relative to the base surface 120. In other suitable embodiments, the tops 128 of the struts 122, 123 are pivotably connected to one another by, for example, and without limitation a hinge (not shown). More specifically, in such embodiments, the pivotable connection between the tops 128 of the struts 122, 123 facilies adjusting the angle α (shown in FIG. 4) at which the struts 122, 123 extend relative to the base surface 120. For example, in some suitable embodiments, the first panel 116 may be pivoted via the hinge (not-shown) such that the first strut and second struts 122, 123 of the first panel 116 contact the respective first and second struts 122, 123 of the second panel 118 along the lengths of the first and second struts (i.e., the struts of the first and second panels are pivoted into a contacting position).

In yet other suitable embodiments, the struts 122, 123 each include a pivotable foot (not shown) that is configured to pivot relative to the body 126 of the struts 122, 123, such that the pivotable foot maintains a face-to-face relationship with the base surface 120 as the angle of the struts 122, 123 relative to the base surface 120 is adjusted. In other suitable embodiments, the struts 122, 123 of the frame assembly 102 are arranged in any manner that enables the frame assembly 102 to function as described herein.

In the illustrated embodiment, the wire grid 130 of the first panel 116 defines a first mounting face, indicated generally at 134, of the frame assembly 102. The wire grid 130 of the second panel 118 defines a second mounting face, indicated generally at 136, of the frame assembly 102. In other suitable embodiments, the frame assembly 102 may define any number of mounting faces that enables the frame assembly 102 to function as described herein.

Figure 3:
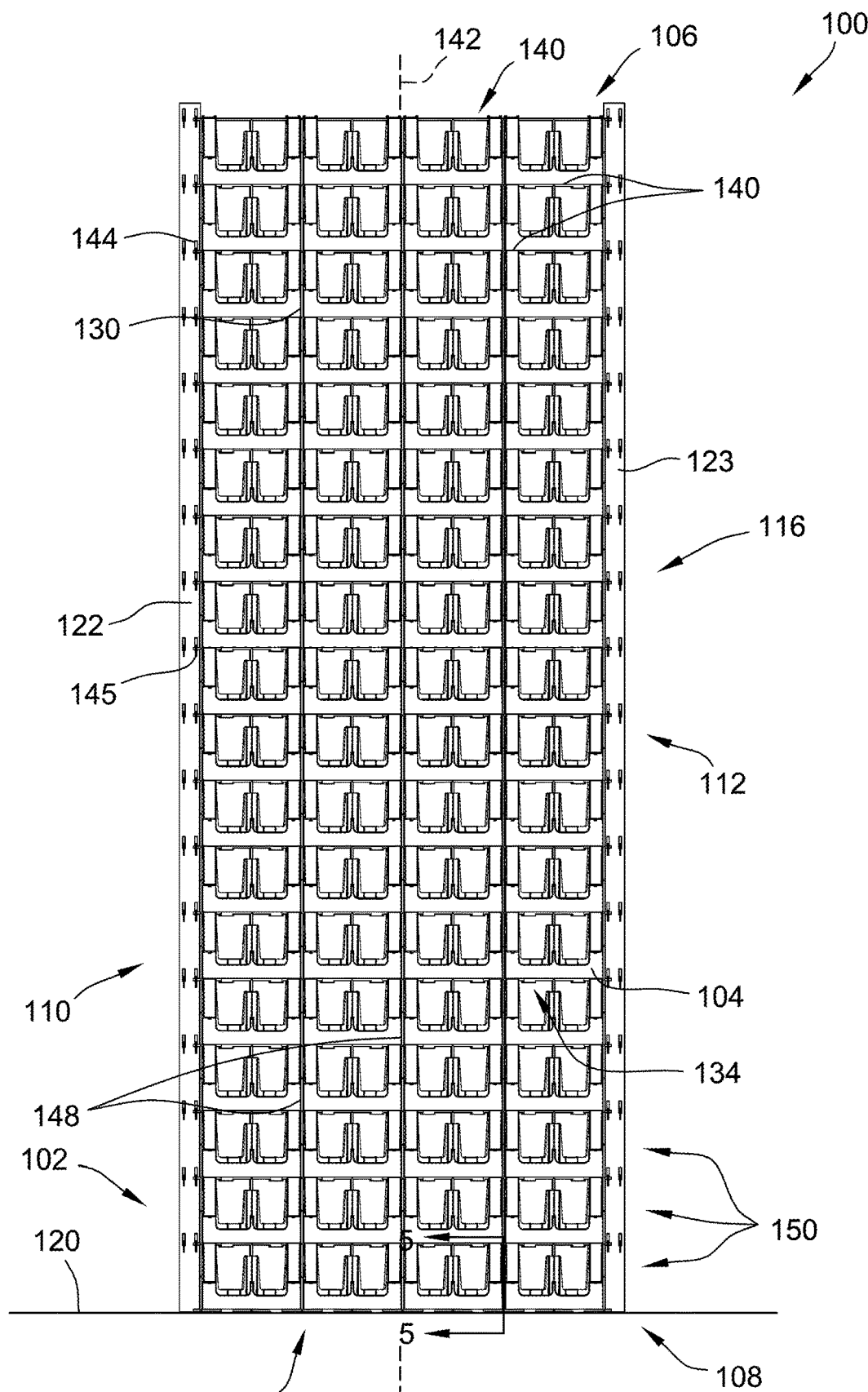
FIG. 3 is a front view of the vertical growing system of FIG. 1.
Figure 4:
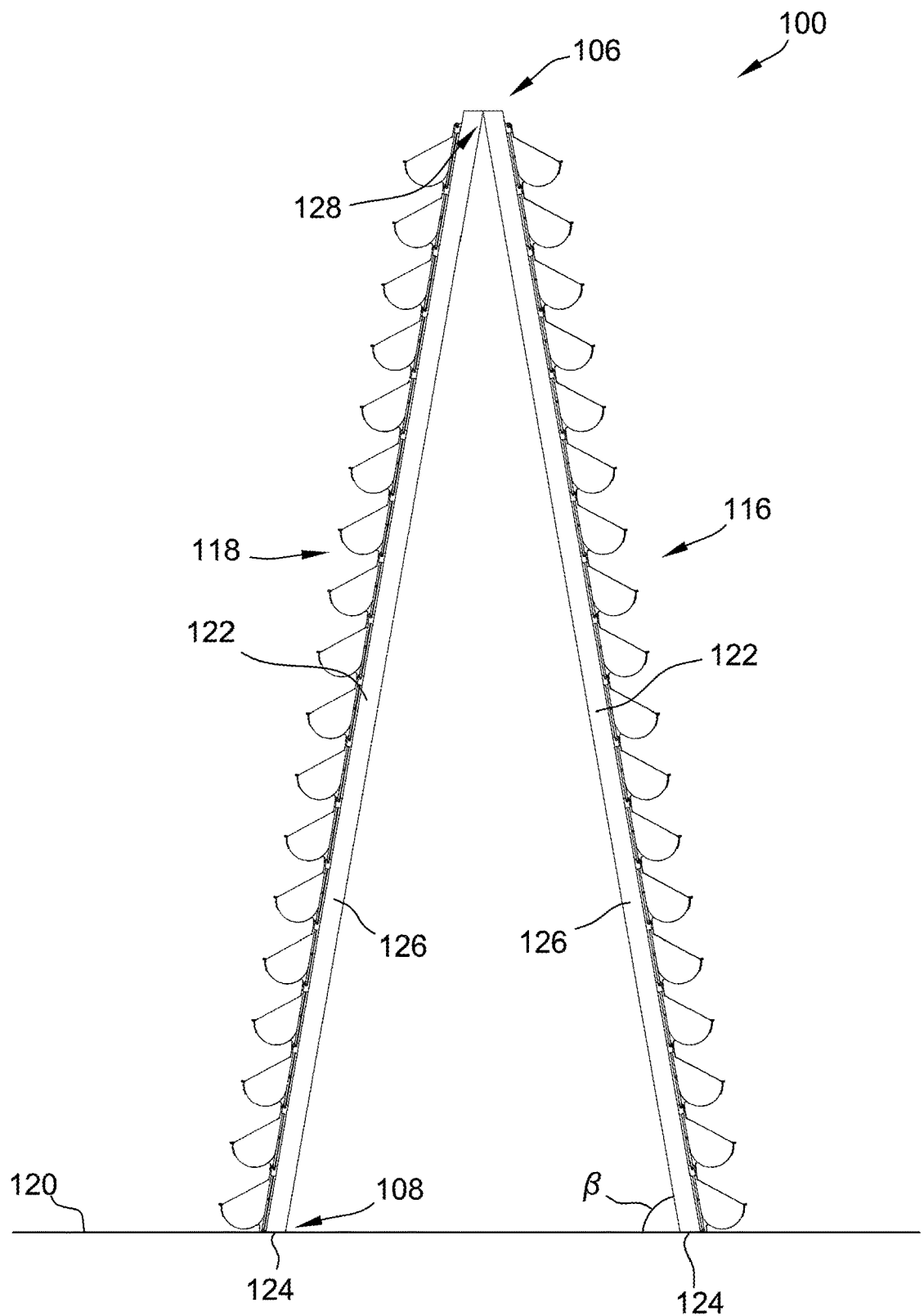
FIG. 4 is a side view of the vertical growing system of FIG. 1.
Figure 5:
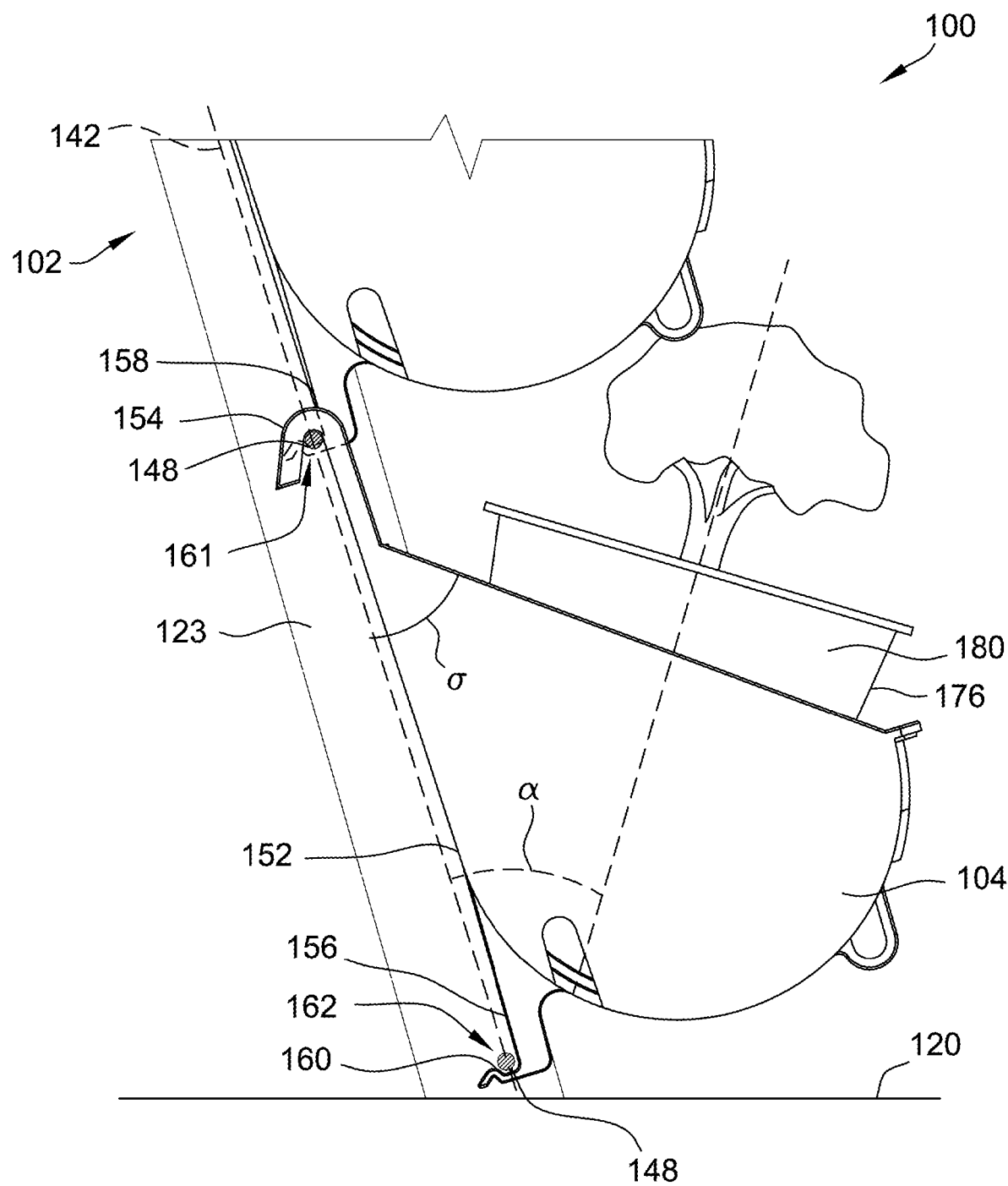
FIG. 5 is an enlarged, cross section of a portion of the vertical growing system of FIG. 1 taken along the line 5-5 shown in FIG. 3.

As best seen in FIG. 3, in the illustrated embodiment, the wire grid 130 of the first panel 116 defines a bottom, indicated generally at 138, and a top, indicated generally at 140. The wire grid 130 is attached to the struts 122, 123 of the first panel 116 such that the bottom 138 of the wire grids 130 is positioned adjacent the base surface 120. That is, in the illustrated embodiment, the wire grid 130 extends vertically above the base surface 120 from the bottom 138 of the wire grid to the top 140 of the wire grid. With reference to FIGS. 3 and 5, the wire grid 130 defines a longitudinal axis, indicated generally at 142, extending from the bottom 138 of the wire grid to the top 140 of the wire grid. In the illustrated embodiment, the wire grid 130 of the second panel 118 is attached to the first and second struts 122, 123 of the second panel in substantially the same manner as described above with respect to the first panel 116.

As best seen in FIGS. 1 and 3, in the illustrated embodiment, each of the struts 122, 123 includes a plurality of support hooks 144 for securing the wire grids 130 to the struts 122, 123. In particular, the support hooks 144 are arranged along the length of each strut 122, 123 and spaced a suitable distance for securing the wire grids 130 to the struts 122, 123. In other suitable embodiments, each strut 122, 123 may include any number of support hooks 144 that enables the frame assembly 102 to function as described herein. For example, and without limitation, in some suitable embodiments, each strut 122, 123 of the frame assembly 102 includes only two support hooks 144. In the illustrated embodiment, the support hooks 144 are arranged to removably receive portions of the wire grids 130 therein. In particular, in the illustrated embodiment, the wire grid includes projections 145 (shown in FIG. 3) that are received within the support hooks 144. In other suitable embodiments, the wire grids 130 may be secured to the struts 122, 123 in any suitable manner that enables the frame assembly 102 to function as described herein. For example, and without limitation, in some suitable embodiments, the wire grids 130 are fixedly attached to the struts 122, 123 by welding the wire grids 130 to the struts 122, 123. In yet other suitable embodiments, the struts 122, 123 may define apertures for receiving portions of the wire grid 130 therein.

Figure 2:
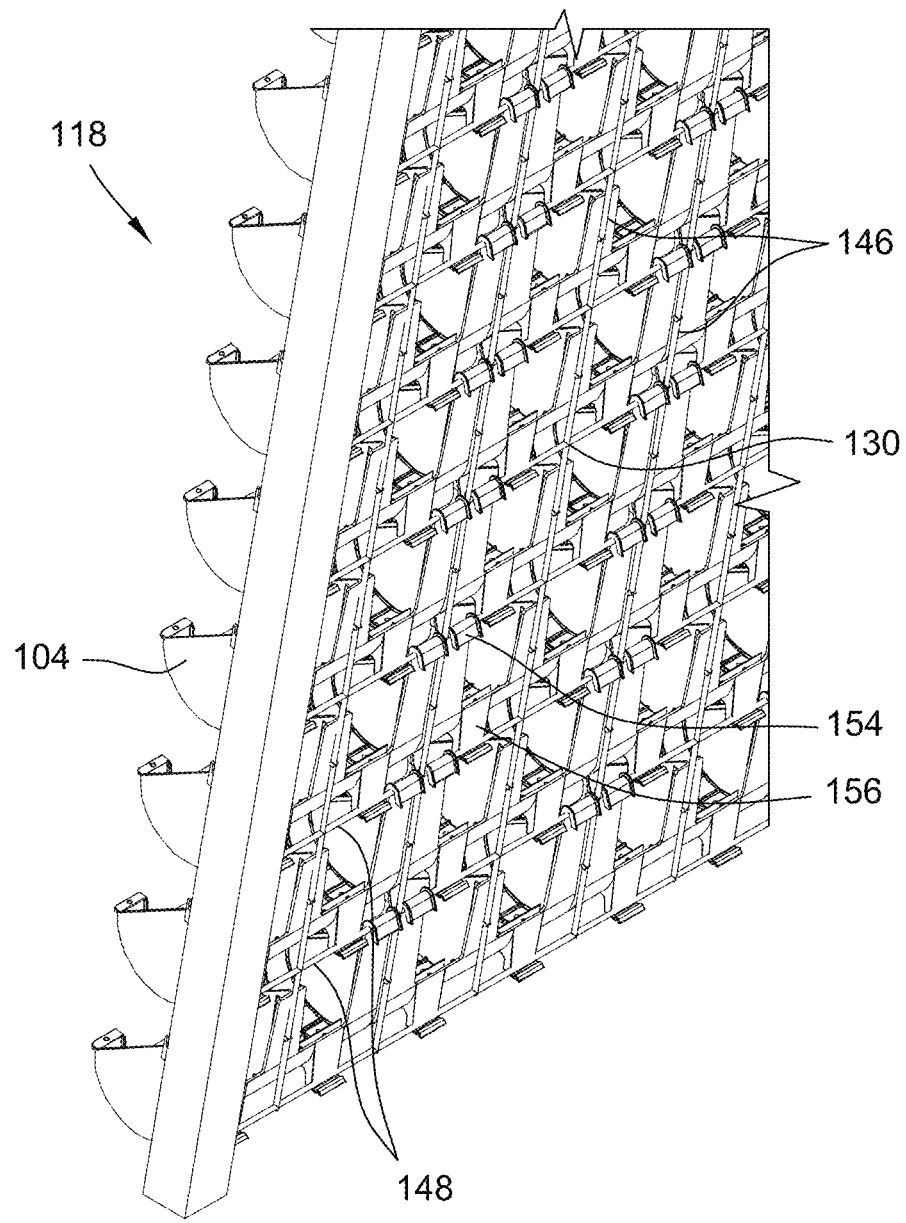
FIG. 2 is an enlarged perspective view of a portion of the vertical growing system of FIG. 1 taken from the area 2 shown in FIG. 1.

Referring to FIG. 2, in the illustrated embodiment, each of the wire grids 130 are formed of a plurality of intersecting wires (or rods), or more broadly, support members. More specifically, in the illustrated embodiment, the wire grid 130 includes a plurality of longitudinally extending wires 146 and a plurality of transversely extending wires 148. The longitudinally extending wires 146 and the transversely extending wires 148 are arranged so as to intersect one another in a "grid formation". In other suitable embodiments, the wire grids 130 may be arranged in any formation that enables the frame assembly 102 to function as described herein.

In the illustrated embodiment, a plurality of mounting trays 104 are mounted to the wire grids 130 at each of the first and second mounting faces 134, 136 of the frame assembly 102. More specifically, in the illustrated embodiment, each of the mounting trays 104 is removably attached to one of the transversely extending wires 148 of the wire grid 130 and is arranged in vertically stacked rows relative to each other, indicated generally at 150. As shown in FIG. 5, in the illustrated embodiment, the mounting trays 104 each include a rear surface 152. In the illustrated embodiment, the mounting trays 104 are attached to the frame assembly 102 such that the rear surfaces 152 of the mounting trays 104 are oriented generally parallel to the longitudinal axis 142 of the wire grid 130.

In the illustrated embodiment, as best shown in FIG. 5, the mounting trays 104 each include a hanger 154 and a foot 156. The hanger 154 has a curved body 158, defining a hanger recess, generally indicated at 161, within the curved body 158. The hanger recess 161 is sized to receive one of the transversely extending wires 148 therein. The foot 156 has a curved body 160, defining a foot recess, generally indicated at 162. The foot recess 162 is also sized to receive a different one of the transversely extending wires 148, vertically displaced from the transversely extending wire 148 received within the hanger recess 161. In particular, in the illustrated embodiment, the foot 156 is configured to receive and engage one of the transversely extending wires 148 within the foot recess 162 such that a portion of the foot is positioned below the transversely extending wire to restrict upward movement of the mounting tray 104 when the mounting tray is mounted on the wire grid 130.

Accordingly, as best shown in FIGS. 2 and 5, in the illustrated embodiment, the mounting trays 104 are each removably attached to the wire grids 130 by receiving one of the transversely extending wires 148 within the hanger recesses 161 of the mounting trays 104 and by receiving another transversely extending wire 148 within the foot recess 162. In other suitable embodiments, the mounting trays 104 may be attached to the frame assembly 102 by any suitable manner that enables the vertical growing system 100 to function as described herein.

Referring again to FIG. 3, in the illustrated embodiment, each row 150 of the mounting trays 104 on the first panel 116 extends between the first strut 122 and second strut 123 of the first panel. Similarly, as best seen in FIG. 1, each row 150 of mounting trays on the second panel 118 extends between the first strut 122 and the second strut 123 of the second panel. The mounting trays 104 are arranged such that the mounting faces 134, 136 are both substantially covered by the mounting trays 104. That is, in the illustrated embodiment, the mounting trays 104 are arranged on the frame assembly 102 at full capacity of the frame assembly. More specifically, as shown in FIG. 5, in the illustrated embodiment, for each of the rows 150 of mounting trays 104, the hangers 154 of the mounting trays 104 are mounted to the same transversely extending wire 148 as the feet 156 of the immediately vertically adjacent mounting trays 104. In other suitable embodiments, the frame assembly 102 may be filled at any capacity that enables the vertical growing system 100 to function as described herein.

Figure 6:
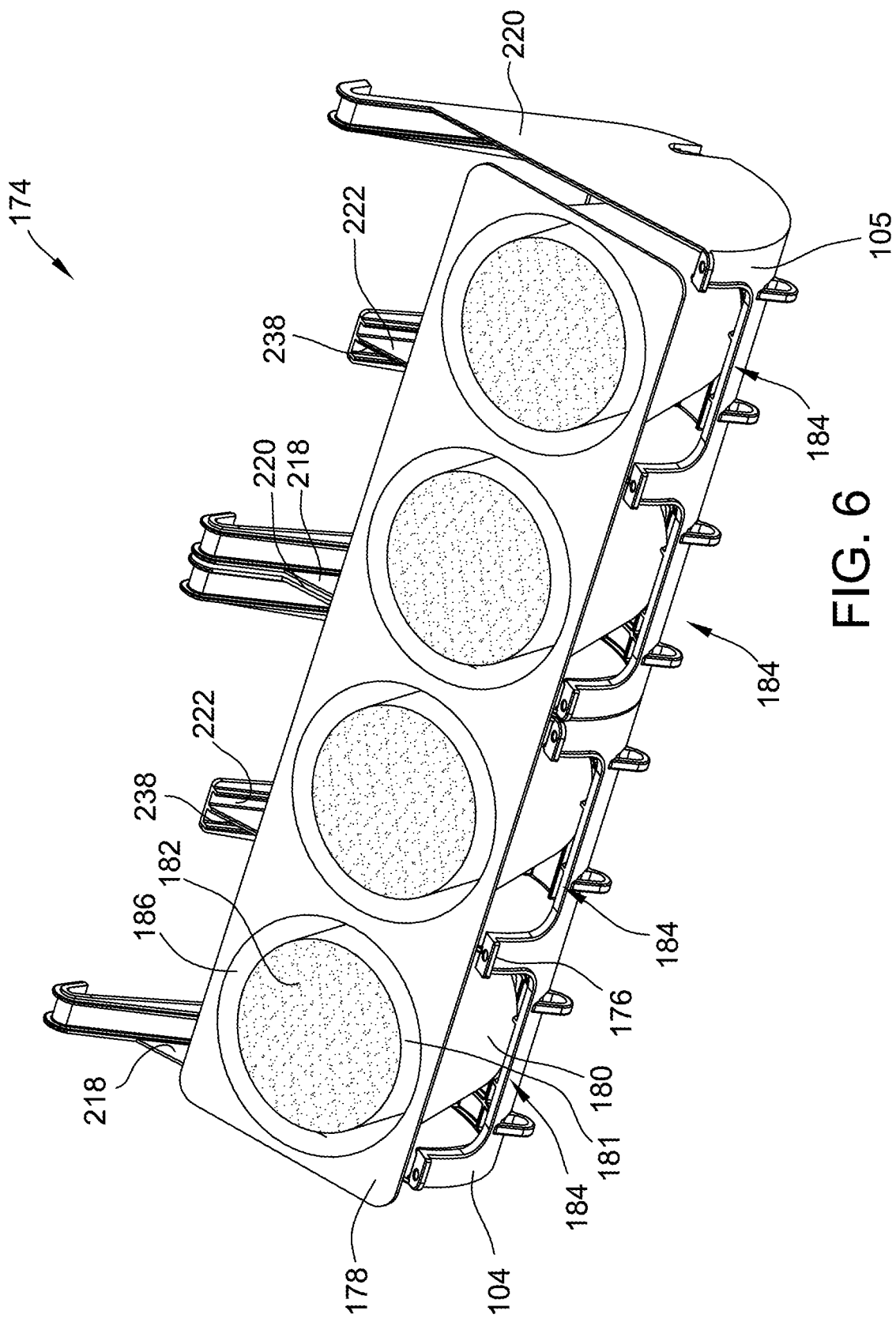
FIG. 6 is a perspective view of one suitable embodiment of a tray assembly for use with the vertical growing systems of FIG. 1.
Figure 7:
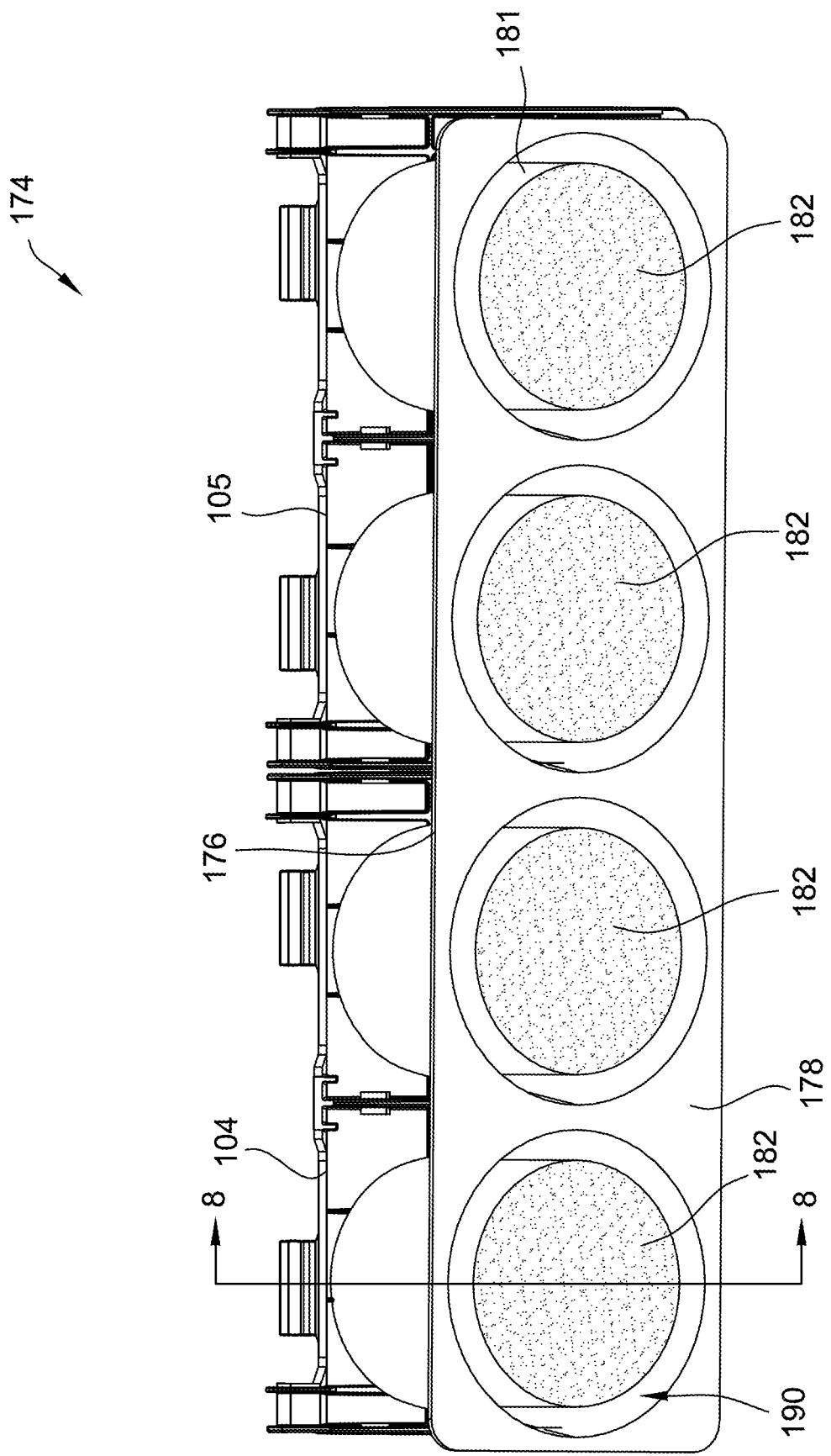
FIG. 7 is a top view of the tray assembly of FIG. 6.
Figure 8:
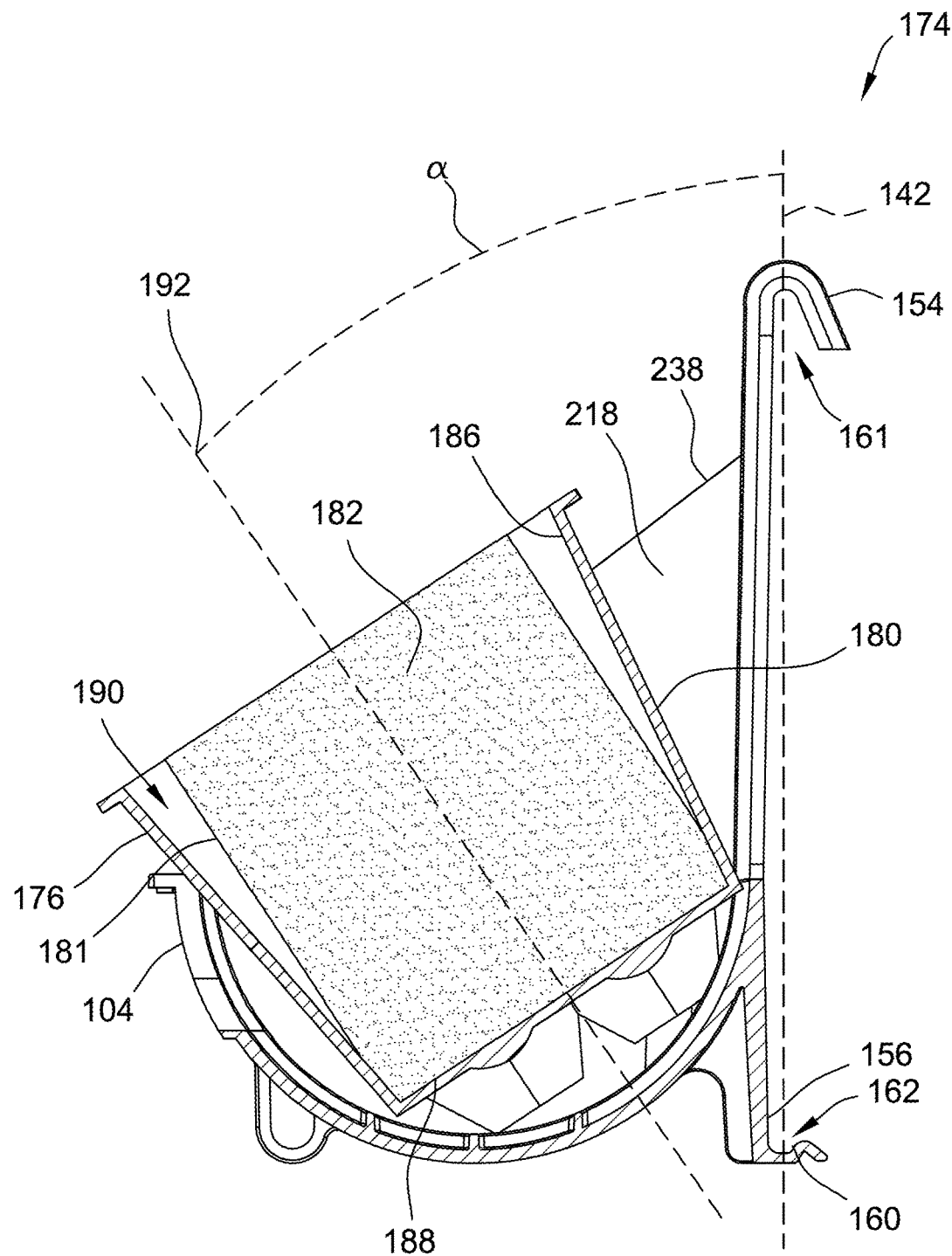
FIG. 8 is a cross section of the tray assembly of FIG. 6 taken along the line 8-8 shown in FIG. 7.

Referring to FIGS. 6-8, a suitable embodiment of a tray assembly 174 for use with the vertical growing system 100 of FIG. 1 is shown. In the illustrated embodiment, the tray assembly 174 includes the first mounting tray 104, a second mounting tray 105 that is substantially identical to the first mounting tray 104, and a propagation tray 176 that extends between and is received within the first and second mounting trays 104, 105.

In the illustrated embodiment, the propagation tray 176 includes a top face 178 and a plurality of chambers 180, generally indicated at 180. In particular, the illustrated embodiment, the propagation tray 176 includes four chambers 180, each shown receiving a respective propagation medium 182 (e.g. soil) within the chambers 180. In other suitable embodiments, the propagation tray 176 may include any number of chambers 180 that enables the propagation tray 176 to function as described herein.

In the illustrated embodiment, two of the chambers 180 of the propagation tray 176 are received within the first mounting tray 104 and the other chambers 180 of the propagation tray 176 are received within the second mounting tray 105. In particular, in the illustrated embodiment, the mounting trays 104, 105 each define troughs, indicated generally at 184. The troughs 184 are each sized and shaped to receive a chamber 180 of the propagation tray 176 therein. Accordingly, in the illustrated embodiment, the first and second mounting trays 104, 105 collectively define four distinct troughs 184 each receiving a respective one of the chambers 180 of the propagation tray 176 therein.

The chambers 180 of the propagation tray 176 are connected to one another at the top face 178 of the propagation tray 176. In particular, with reference to FIG. 8, one of the chambers 180 of the propagation tray 176 is shown in cross-section. In the illustrated embodiment, the chamber 180 of the propagation tray 176 includes a sidewall 186 disposed below the top face 178. The sidewall 186 extends downward from the top face 178 to a bottom 188. The sidewall 186 and the bottom of each chamber 180 collectively define a respective chamber 180. A longitudinal axis 192 of the chamber 180 is shown extending through the bottom 188. In one suitable embodiment, at least one of the sidewall 186 and the bottom 188 includes an aperture (not shown) extending through the propagation tray 176 such that the chamber 180 is in fluid communication, via the aperture, with air and/or irrigation fluid in the respective one of the mounting trays 104, 105 in which the chamber is received. For example, in such embodiments, the aperture in the propagation tray 176 facilitates the circulation of at least one of air and irrigation fluid within the propagation medium 182 received within the chamber 180.

In the illustrated embodiment, the chambers 180 are each sized and shaped to receive the propagation medium 182 therein. In particular, as best shown in FIG. 8, the propagation medium 182 is received within the chamber 180 of the propagation tray 176 such that the propagation medium 182 extends along the longitudinal axis 192 of the chamber 180. The propagation medium 182 may include, for example, and without limitation, soil, compost, organic feedstocks, composted products, or any other medium that supports, facilitates, and/or encourages the growth of plants. In the illustrated embodiment, the propagation media 182 are each cylindrically shaped. Accordingly, in the illustrated embodiment, the sidewalls 186 of each chamber 180 are annular to receive the cylindrically shaped propagation media 182 within the interior sidewalls 186. The propagation media 182 are each maintained in cylindrical shape within the chamber recesses 190 (shown in FIGS. 7 and 8) by a propagation paper 181 extending along the outer periphery of the respective propagation media 182. In other suitable embodiments, the propagation tray 176 is sized and shaped in any manner that enables the propagation tray 176 to function as described herein.

Referring to FIGS. 9-13, in the illustrated embodiment, the mounting tray 104 includes a front, generally indicated at 194, a rear generally indicated at 196, a first end, generally indicated at 198, and a second end, generally indicated at 200, opposite the first end 198.

In the illustrated embodiment, the mounting tray 104 includes a concave interior surface 202 extending from the rear 196 of the mounting tray 104 to the front 194 of the mounting tray 104. In other suitable embodiments, the interior surface 202 of the mounting tray 104 is shaped in any manner that enables the mounting tray 104 to function as described herein. For example, and without limitation, in some suitable embodiments, the interior surface 202 is planar. In the illustrated embodiment, the mounting tray 104 further includes a first hanger 154 located adjacent the first end 198 and extending vertically upward from the concave interior surface 202 at the rear 196 of the mounting tray 104. The mounting tray 104 further includes a second hanger 155 located adjacent the second end 200 and extending vertically upward from the concave interior surface 202 at the rear 196 of the mounting tray 104. A support member 204 is located at the rear of the mounting tray 104 between the first hanger 154 and the second hanger 155 and extends upwards from the concave interior surface 202 parallel to the first hanger 154 and the second hanger 155. In other suitable embodiments, the mounting tray 104 includes any number of hangers 154, 155 that enable the mounting tray 104 to function as described herein. For example, and without limitation, in some suitable embodiments, the support member 204 includes a hanger (not shown) having a curved body defining a hanger recess.

Figure 10:
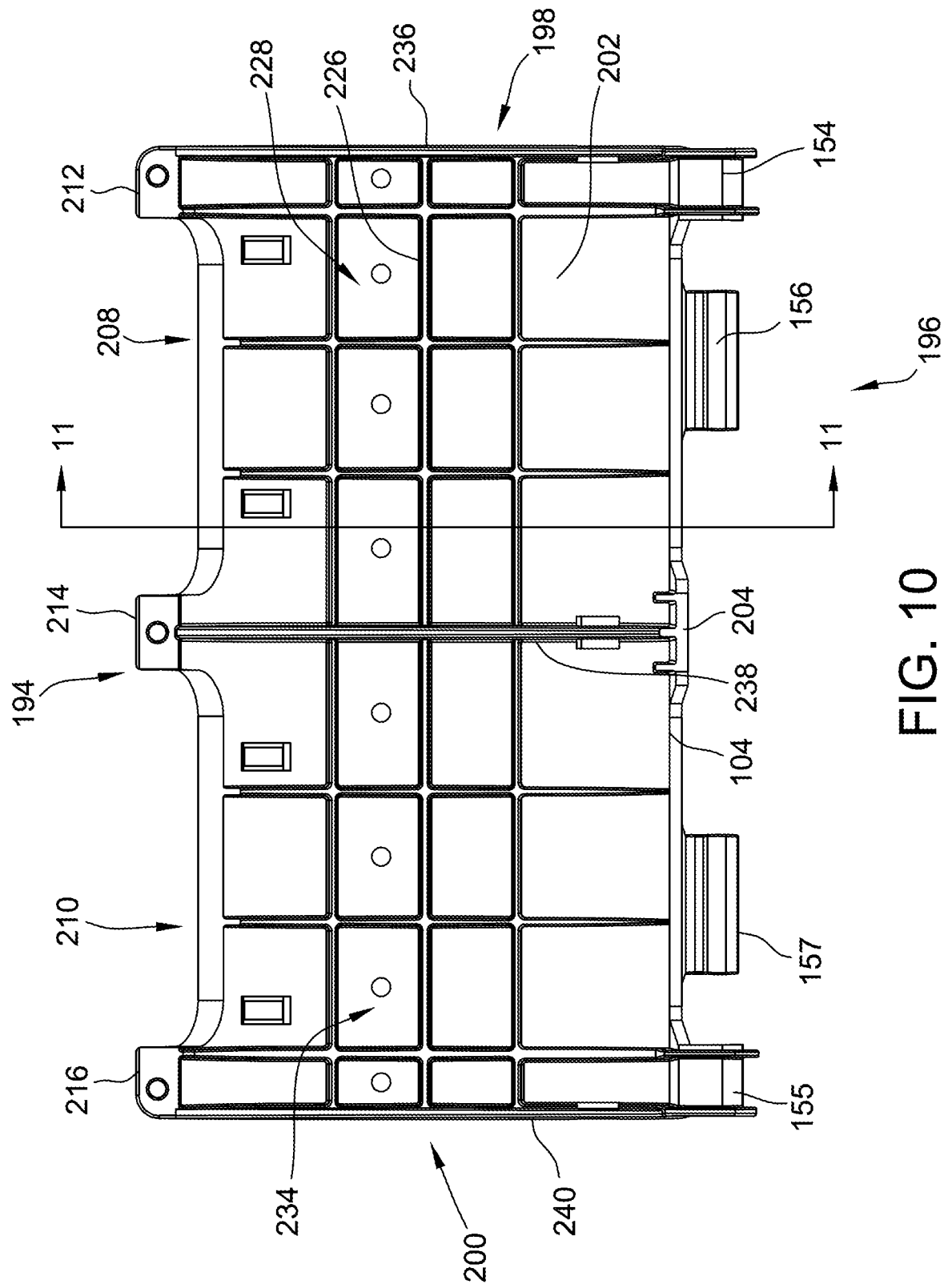
FIG. 10 is a top view of the mounting tray shown in FIG. 9.
Figure 13:
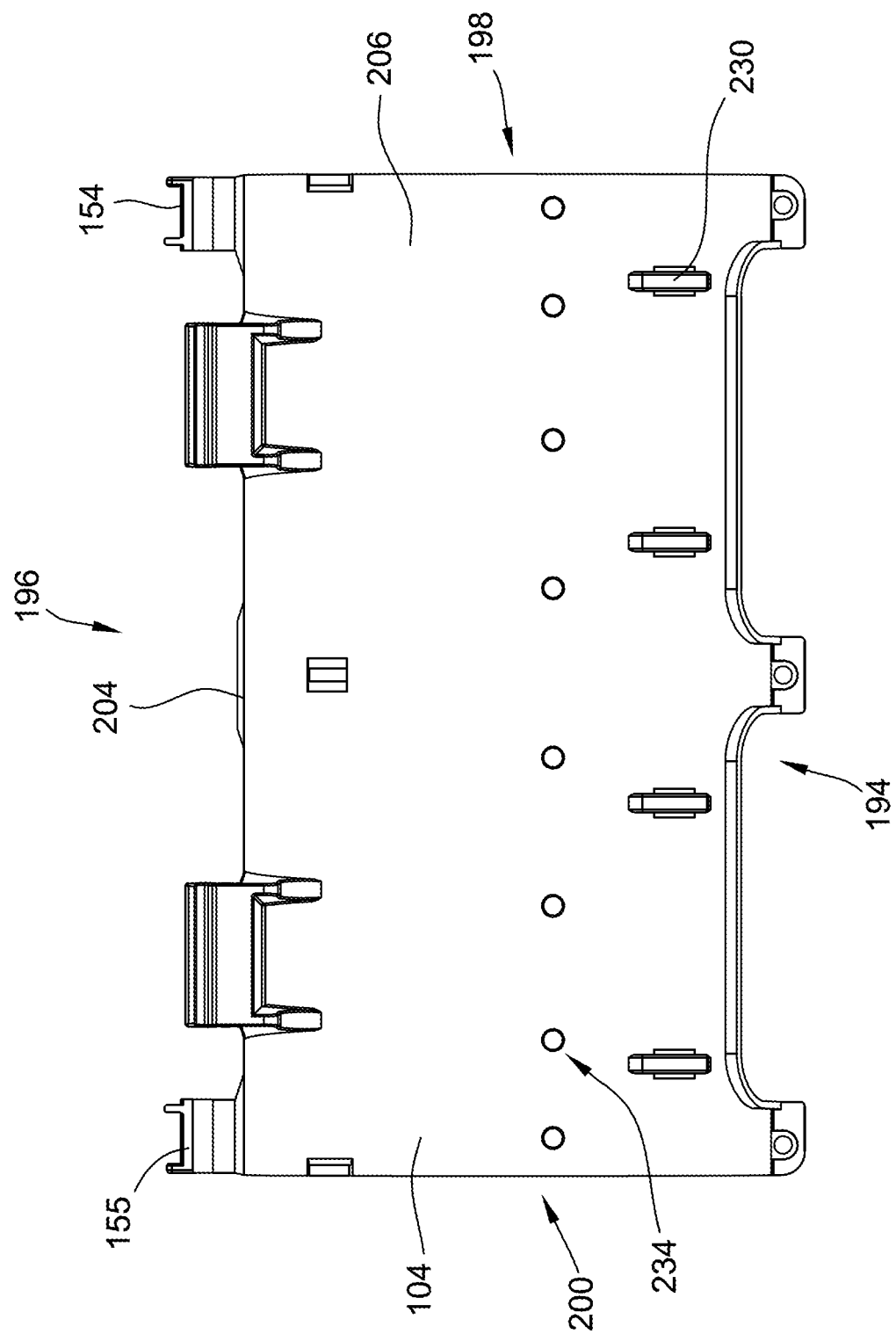
FIG. 13 is a bottom view of the mounting tray shown in FIG. 9.

As best shown in FIGS. 10 and 13, the mounting tray 104 further includes a convex outer surface 206, a first foot 156, and a second foot 157. The first foot 156 and the second foot 157 are each attached to the convex outer surface 206 and extend vertically downward therefrom. In particular, in the illustrated embodiments, the first foot 156 and the second foot 157 are both positioned transversely between the first hanger 154 and the second hanger 155. In other suitable embodiments, the first foot 156 and the second foot 157 are positioned on the mounting tray 104 in any manner that enables the mounting tray 104 to function as described herein.

In the illustrated embodiment, the concave interior surface 202 terminates at the front 194 of the mounting tray 104 at first and second lips 208, 210 defined in the front 194 of the mounting tray 104. More specifically, in the illustrated embodiment, the mounting tray 104 includes a first front bar 212, a second front bar 214, and a third front bar 216. The first lip 208 is defined between the first front bar 212 and the second front bar 214 and the second lip 210 is defined between the second front bar 214 and the third front bar 216. A first end wall 218 located at the first end 198 of the mounting tray 104 extends between the first front bar 212 and the first hanger 154. A second end wall 220 located at the second end 200 of the mounting tray 104 extends between the third front bar 216 and the second hanger 155. An intermediate sidewall 222 extends between the second front bar 214 and the support member 204.

Figure 9:
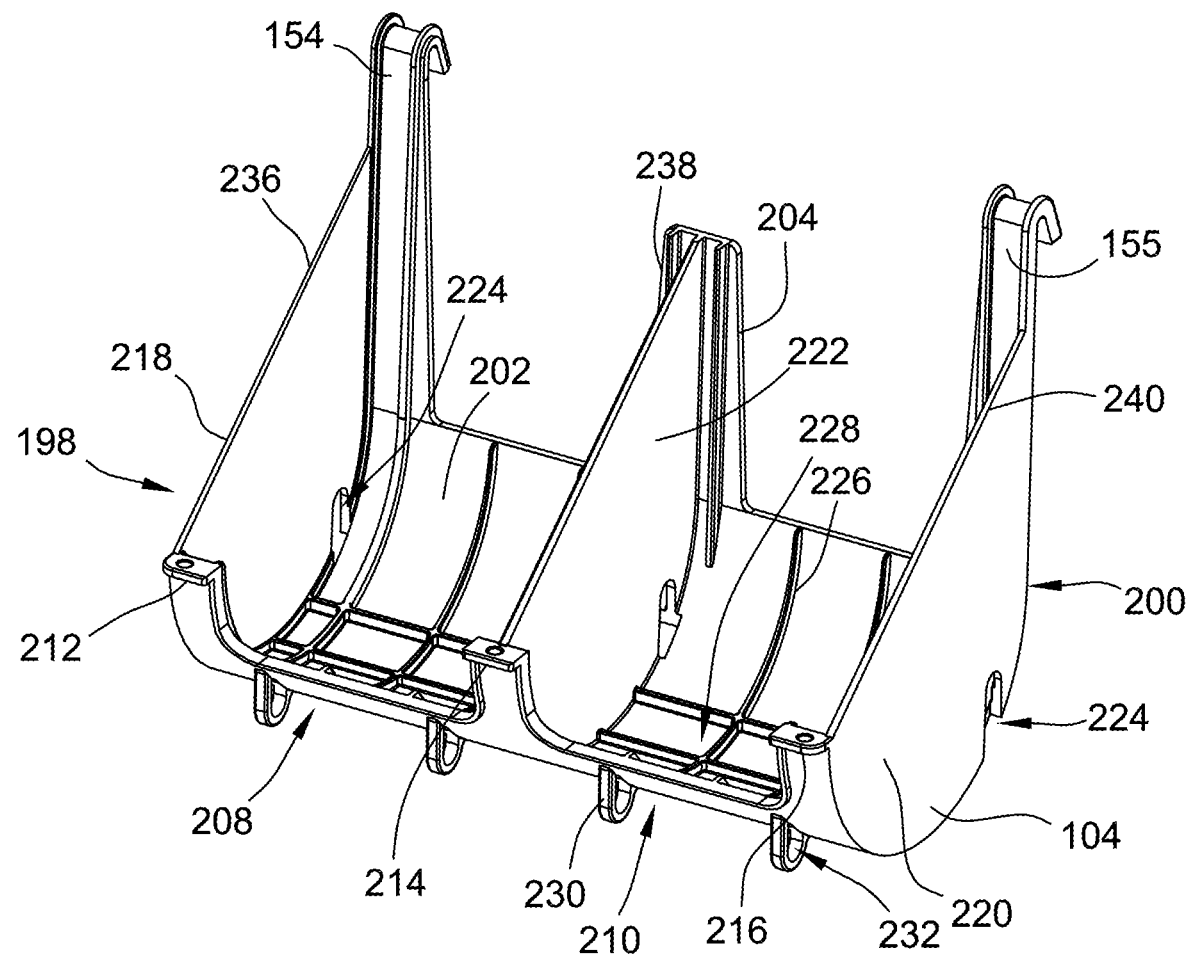
FIG. 9 is a perspective view of a mounting tray of the tray assembly shown in FIG. 6.

With reference to FIG. 9, in the illustrated embodiment, the first end wall 218, the intermediate sidewall 222, and the second end wall 220, each define an irrigation aperture, generally indicated at 224, therethrough. More specifically, the irrigation aperture 224 is sized to receive an irrigation line (e.g., a drip line) therethrough. As best seen in FIG. 10, in the illustrated embodiment, the mounting tray 104 also includes a plurality of intersecting ribs 226 extending upward from the concave interior surface 202 to define irrigation recesses, indicated generally at 228, between the intersecting ribs 226. In particular, the irrigation recesses 228 are sized to collect fluid between the ribs 226. In the illustrated embodiment, the mounting tray 104 further includes a plurality of rings 230 attached to the convex outer surface 206 of the mounting tray 104 adjacent the first and second lips 208, 210. The rings 230 are annular shaped and define openings, generally indicated at 232, therethrough. More specifically, the openings 232 of the rings 230 are sized to receive an additional irrigation line therethrough.

In the illustrated embodiment, the mounting tray 104 further includes a plurality of apertures, indicated generally at 234, defined within the concave interior surface 202 of the mounting tray 104 and extending through the mounting tray 104. In particular, the apertures 234 permit fluid within the mounting tray 104 to flow therethrough thereby facilitating irrigation of the plants located within a mounting tray (not shown) that is positioned immediately vertically below the mounting tray 104. In suitable embodiments, the apertures 234 may be defined within the concave interior surface 202 at a predetermined position to facilitate draining fluid overflow from one of the irrigation recesses 228.

Figure 11:
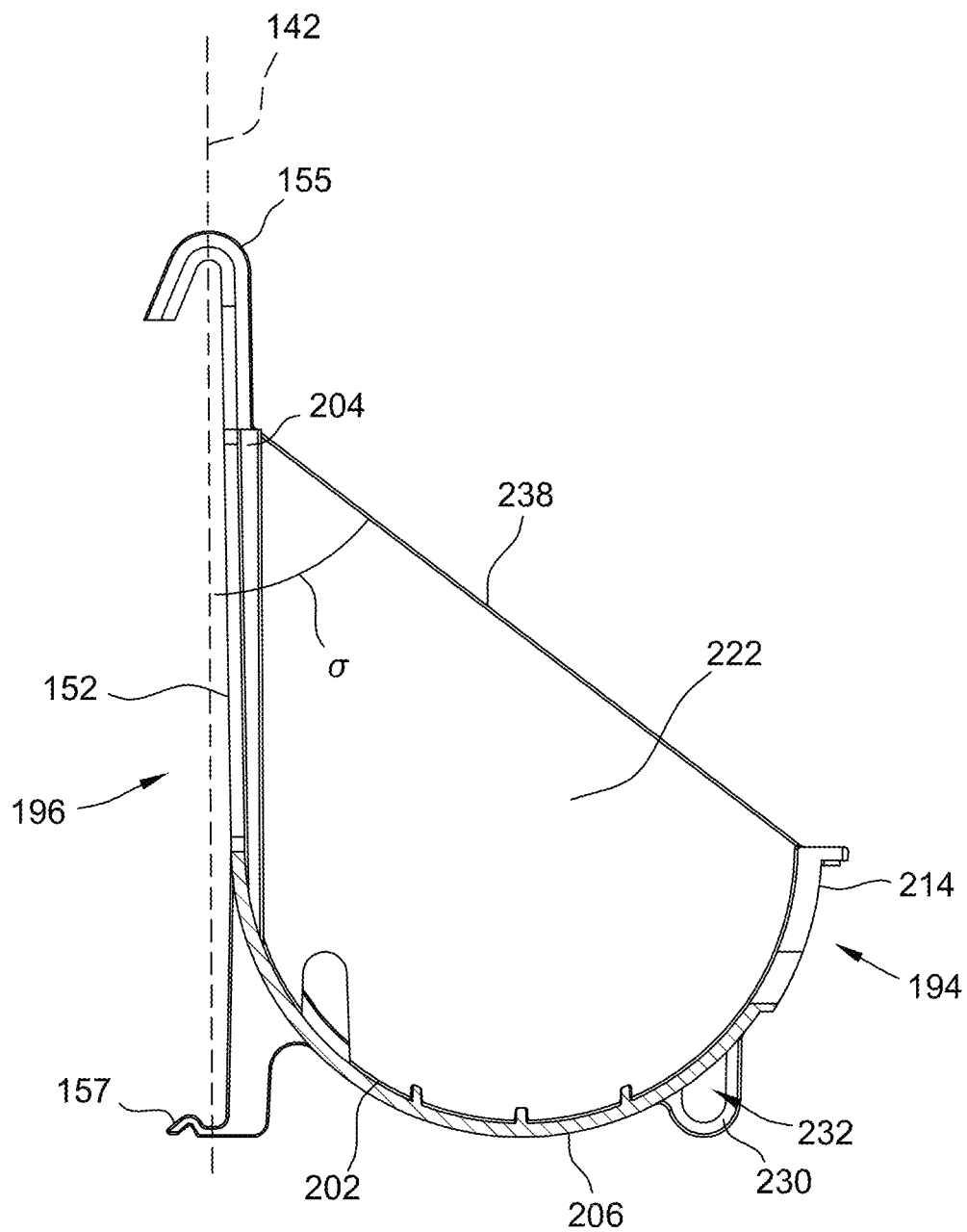
FIG. 11 is a cross section of the mounting tray shown in FIG. 9 taken along the line 11-11 shown in FIG. 10.
Figure 12:
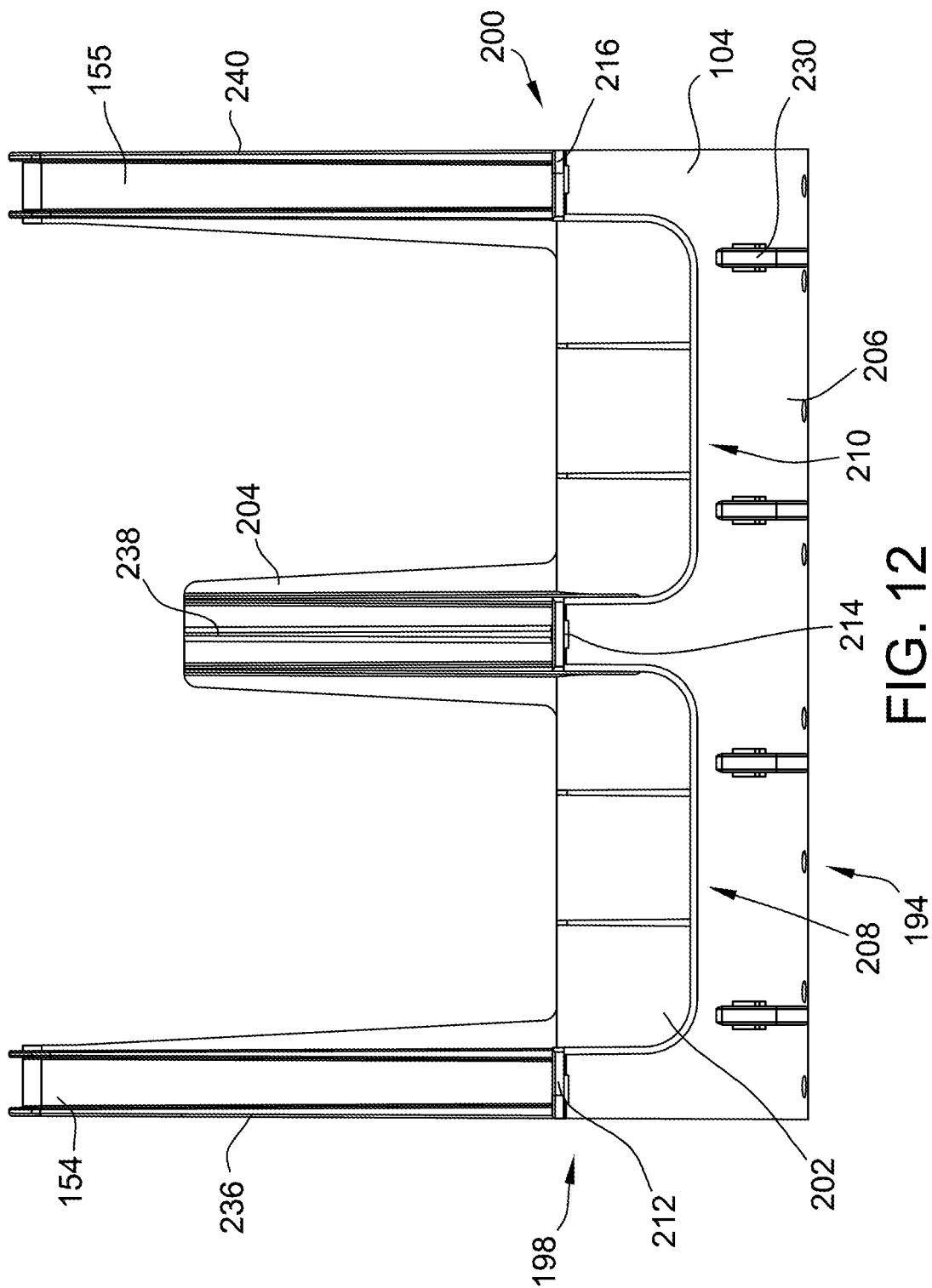
FIG. 12 is a front view of the mounting tray shown in FIG. 9.

Referring again back to FIG. 9, in the illustrated embodiment, the first end wall 218, the intermediate sidewall 222, and the second end wall 220, or more broadly, the positioning members, each extend vertically from the concave interior surface 202 and terminate respectively, at a first edge 236, an intermediate edge 238, and a second edge 240. Referring to FIG. 11, the intermediate sidewall 222 is shown extending between the second front bar 214 and the support member 204. A longitudinal axis 142 of a wire grid, similar to the wire grid 130 shown in FIGS. 1-5, is depicted for reference.

In the illustrated embodiment, the intermediate sidewall 222 is sized such that the intermediate edge 238 is oriented at an oblique positioning angle σ relative to the longitudinal axis 142 of the wire grid 130 (i.e., an axis extending parallel to the rear surface 152 of the mounting tray 104) when the mounting tray 104 is attached to the transversely extending wires 148, as shown in FIG. 5. The positioning angle σ of the second edge 240 may be between 15 degrees and 75 degrees. More specifically, in the illustrated embodiment, the positioning angle σ of the intermediate edge 238 is 45 degrees. In the illustrated embodiment, the first edge 236 and the second edge 240 are also oriented at the same positioning angle σ, relative to the longitudinal axis 142 of the wire grid 130, as the first edge 236 and the second edge 240. In other suitable embodiments, the first edge 236, intermediate edge 238, and second edge 240 are oriented at any suitable angle relative to the longitudinal axis 142 of the wire grid that enables the mounting tray 104 to function as described herein.

Referring back to FIGS. 6-8, when the propagation tray 176 is received within the mounting tray 104, the intermediate sidewall 222, or, more specifically, the intermediate edge 238 of the intermediate sidewall 222, engages the propagation tray 176 to orient the chambers 180 of the propagation tray 176 at an angle, generally indicated at α, relative to the longitudinal axis 142 of the wire grid 130 (shown in FIG. 3). In particular referring to FIG. 8, the orientation angle α of the chambers 180 of the propagation tray 176 may be between 15 degrees and 75 degrees. More specifically, in the illustrated embodiment, the orientation angle α of the chambers 180 of the propagation tray 176 is 45 degrees. In other suitable embodiments, chambers 180 of the propagation tray 176, when engaged with the intermediate sidewall 222, are oriented at any suitable angle relative to the longitudinal axis 142 of the wire grid 130 (shown in FIGS. 1-5) that enables the mounting tray 104 to function as described herein.

Referring to FIG. 6, as described above, in the illustrated embodiment, the first and second end walls 218, 220 of the mounting tray 104 are oriented at the same positioning angle σ as the intermediate sidewall 222. Accordingly, the second end wall 220 of the first mounting tray 104 and the first end wall 218 of the second mounting tray 105 also engage the propagation tray 176 to support each of the chambers 180 of the propagation tray 176 at the orientation angle α relative to the longitudinal axis 142 of the wire grid. In other suitable embodiments, any one of the first end wall 218, second end wall, or intermediate wall 222 may engage the propagation tray 176. In yet further suitable embodiments, the mounting tray 104 does not include a first end wall 218 or a second end wall 220. As a result, in some such embodiments, only the intermediate sidewall 222 engages the propagation tray 176.

Referring to FIG. 5, in the illustrated embodiment, the mounting trays 104 are configured such that the positioning angle σ and the orientation angle α are complementary angles. In other words, in other embodiments where the mounting tray 104 includes an intermediate sidewall 222 extending at a positioning angle σ that is smaller than the illustrated positioning angle σ (i.e., the intermediate edge 238 extends at a steeper incline), the resulting orientation angle α of the chambers 180 of the propagation tray 176 will be correspondingly increased (i.e., plants within the chambers 180 will extend more outwardly from the frame assembly 102). Conversely, in embodiments where the mounting tray 104 includes an intermediate sidewall 222 extending at a positioning angle σ that is greater than the illustrated positioning angle σ (i.e., the intermediate edge 238 extends at a shallower incline), the resulting orientation angle α of the chambers 180 of the propagation tray 176 will be correspondingly increased (i.e., plants within the chambers 180 will extend more outwardly from the frame assembly 102). Accordingly, the mounting tray 104 of the present disclosure allows for controlling the outwards orientation of plants on the vertical growing system 100.

In other suitable embodiments, at least one of the first end wall 218, second end wall 220, and intermediate sidewall 222 of the mounting tray 104 may be removable. For example, and without limitation, in some such embodiments, the mounting tray 104 does not include a first end wall 218 or a second end wall 220. In such embodiments, removal of the intermediate sidewall 222 facilitates stacking successive mounting trays 104 within one another during transportation to minimize the space occupied by the mounting trays. In such embodiments, the intermediate sidewall 222 may then be removably attached to the mounting tray 104 during installation of the vertical growing system 100. In yet other suitable embodiments, the intermediate sidewall 222 of the mounting tray 104 may be selectively adjustable to facilitate manipulating the positioning angle σ of the intermediate edge 238 and thereby adjust the orientation angle α of the chambers 180 of the propagation tray 176.

In addition, in at least some such embodiments, at least one of the first end wall 218, second end wall 220, and intermediate sidewall 222 of the mounting tray 104 may be moveable horizontally (i.e., between the first end 198 and the second end 200) within the mounting tray 104. For example, and without limitation, in some such embodiments, the intermediate sidewall 222 may be removably attached to a slidable platform (not shown) that is removably attachable to one of the intersecting ribs 226. In such embodiments, the intermediate sidewall 222 is moveable within the mounting tray 104 by repositioning the slidable platform along one of the intersecting ribs 226. In other suitable embodiments, the mounting tray 104 may define a plurality of repositioning slots (not shown) between the first end 198 and the second end 200. In such embodiments, at least one of the first end wall 218, second end wall 220, and intermediate sidewall 222 may be repositioned within the mounting tray 104 by removing the one of the walls 218, 220, 222 from one of the repositioning slots and placing it in a different repositioning slot. In such embodiments, moving the walls 218, 220, 222 horizontally within the mounting tray 104 allows for securing propagation trays 176 (shown in FIG. 7) of different sizes within the mounting tray.

With reference now to FIGS. 14-17 another suitable embodiment of a vertical growing system 300 is shown. In particular, the illustrated embodiment of FIGS. 14-17 is substantially similar to the vertical growing system 100 described above with respect to FIGS. 1-13. The following describes at least some of the differences between the two systems 100, 300.

Figure 14:
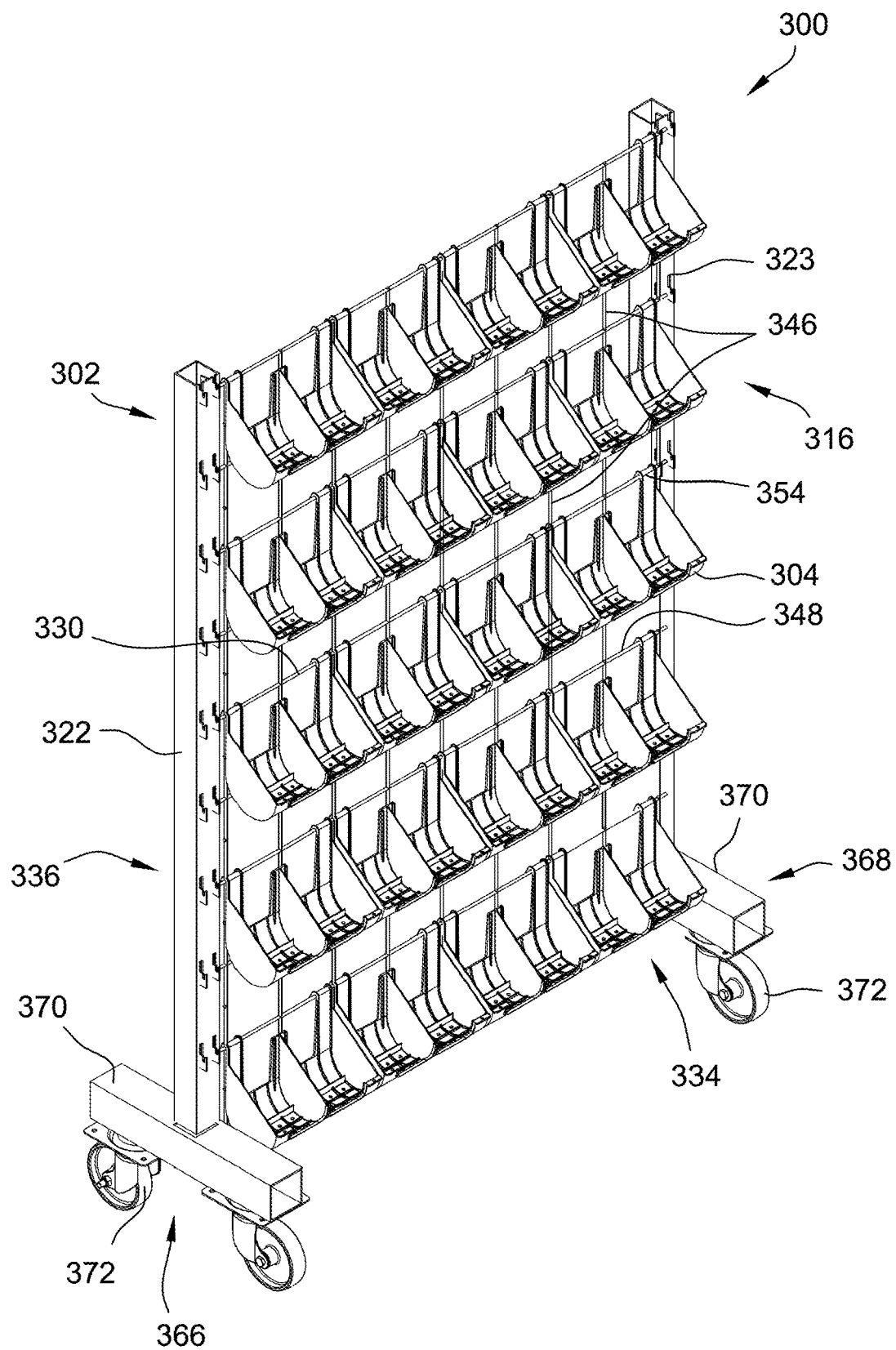
FIG. 14 is a perspective view of another suitable embodiment of a vertical growing system of the present disclosure.

As shown in FIG. 14, in the illustrated embodiment, the frame assembly 302 includes a single panel 116. The panel 116 includes a first strut 322, a second strut 323, and a wire grid 330 extending between the first and second struts 322, 323. The first strut 322 is mounted to, and supported by, a first platform, indicated generally at 366 and the second strut 323 is mounted to, and supported by, a second platform, indicated generally at 368. Each of the first and second platforms 366, 368 includes a bar 370 and a pair of wheels 372 rotatably mounted to the bar 370. The bars 370 are oriented generally parallel to a base surface 320, with the respective wheels 372 each extending down from the bars 370 and contacting the base surface 320. The wheels 372 are each configured to support the frame assembly 302 on the base surface 320 and are configured for rolling on the base surface 320 to facilitate repositioning the frame assembly 302 on the base surface 320. In one suitable embodiment, the wheels 372 are locked to inhibit moving the frame assembly 302 on the base surface 320.

In the illustrated embodiment, the struts 322, 323 of the frame assembly 302 each extend vertically upwards from the platforms 366, 368 and are transversely oriented relative to the bar 370. In other words, in the illustrated embodiment, the struts 322, 323 are attached to the bar 370 such that the struts 322, 323 are transversely oriented to the base surface 320 when the frame assembly 302 is positioned on the base surface 320. Thus, with reference to FIG. 15, in the illustrated embodiment, the longitudinal axis 342 of the wire grid 330 is transversely oriented relative to the base surface 320.

In the illustrated embodiment, the wire grid 330 includes a plurality of longitudinally extending wires 346 and a plurality of transversely extending wires 348. The longitudinally extending wires 346 and the transversely extending wires 348 are arranged so as to intersect one another in a "grid formation". In other suitable embodiments, the wire grids 330 may be arranged in any formation that enables the frame assembly 302 to function as described herein.

Figure 15:
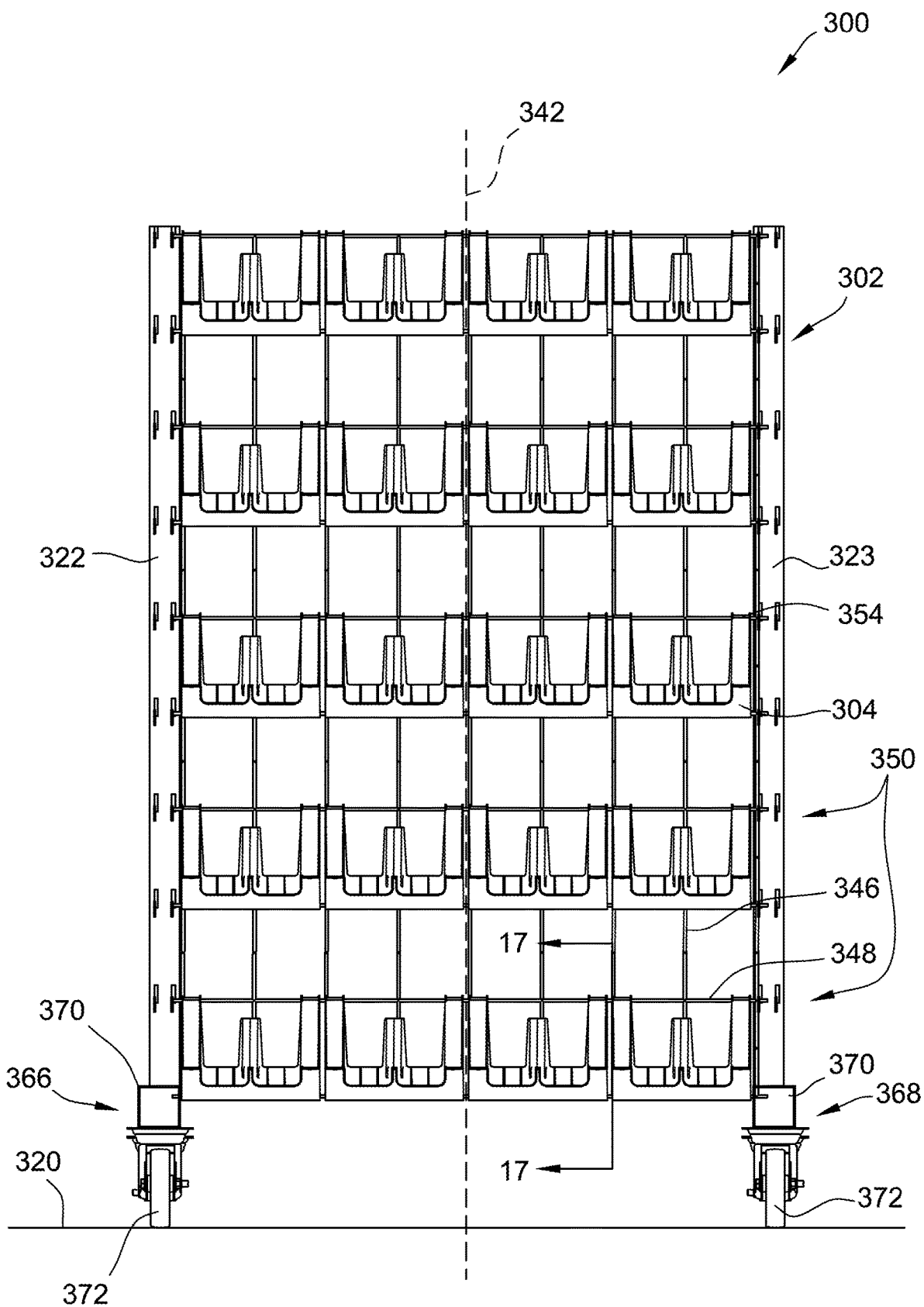
FIG. 15 is a front view of the vertical growing system of FIG. 14.

As shown in FIG. 15, the wire grid 330 defines a first and second mounting face 334, 336 of the frame assembly 302. In particular, in the illustrated embodiment, the mounting trays 304 are only mounted on the first mounting face 334 of the frame assembly 302. In other embodiments, the mounting trays 304 may be mounted on either one of or both of the first and second mounting faces 334, 336.

In the illustrated embodiment, as best shown in FIGS. 14 and 15, the mounting trays 304 are arranged such that the first mounting face 334 of the frame assembly 302 is only partially covered by the mounting trays 304. More specifically, the mounting trays 304, in the illustrated embodiment, are arranged on the frame assembly 302 at half capacity of the frame assembly 302. In particular, in the illustrated embodiment, for each of the rows 350 of mounting trays 304, the hangers 354 of the mounting trays 304 are mounted to a different transversely extending wire 348 of the wire grid 330 than the feet of the immediately vertically adjacent mounting trays 304. In other suitable embodiments, the frame assembly 302 may be filled at any capacity that enables the vertical growing system 300 to function as described herein.

Figure 16:
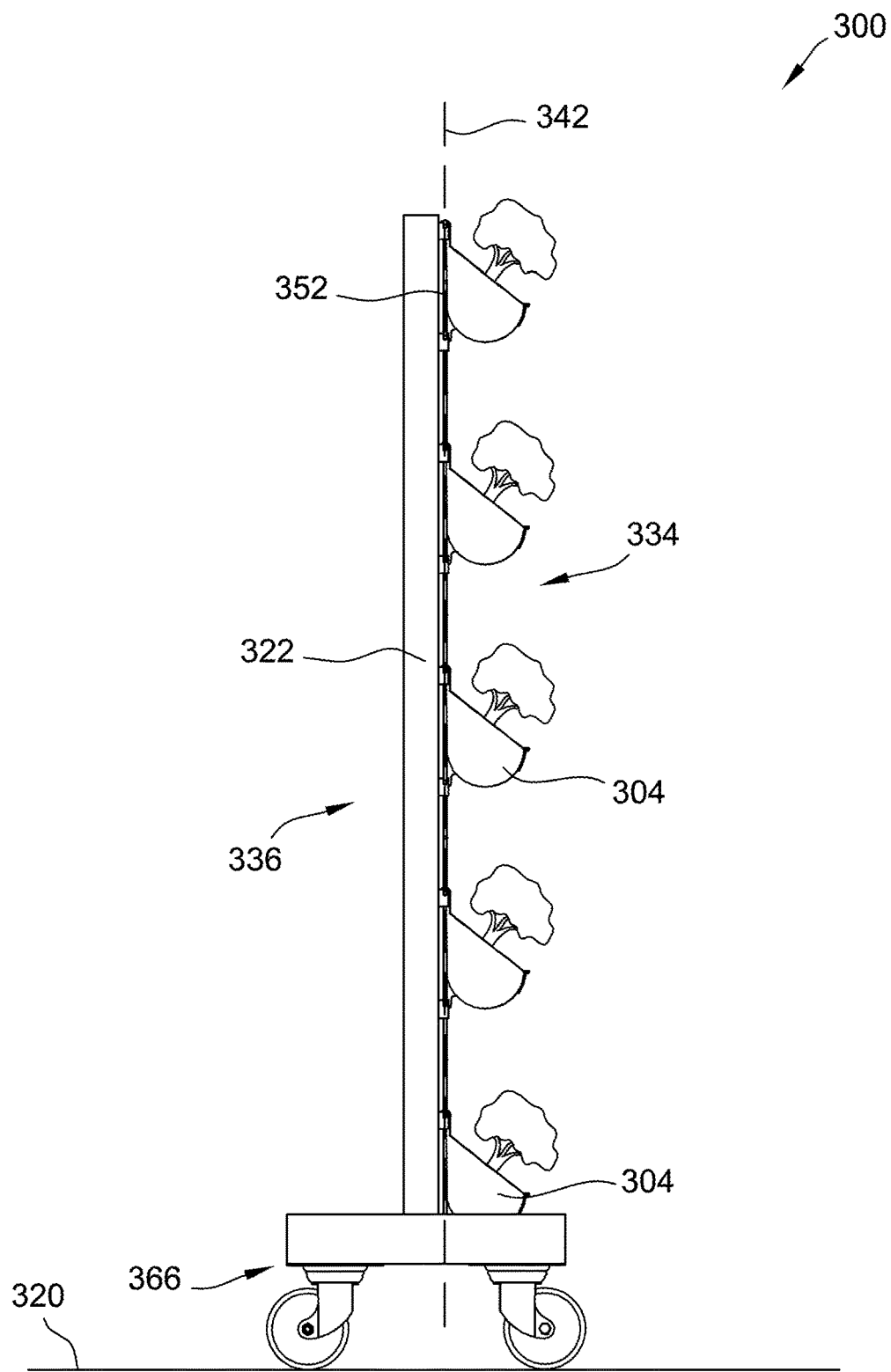
FIG. 16 is a side view of the vertical growing system of FIG. 14.

As best shown in FIG. 16, in the illustrated embodiment, the mounting trays 304 are attached to the frame assembly 302 such that the rear surfaces 352 of the mounting trays 304 are oriented parallel to the longitudinal axis 342 of the wire grid 330. In other words, in the illustrated embodiment, the mounting trays 304 are attached to the frame assembly 302 such that the rear surfaces 352 of the mounting trays 304 are transversely oriented to the base surface 320 when the frame assembly 302 is rested on a flat base surface 320.

Figure 17:
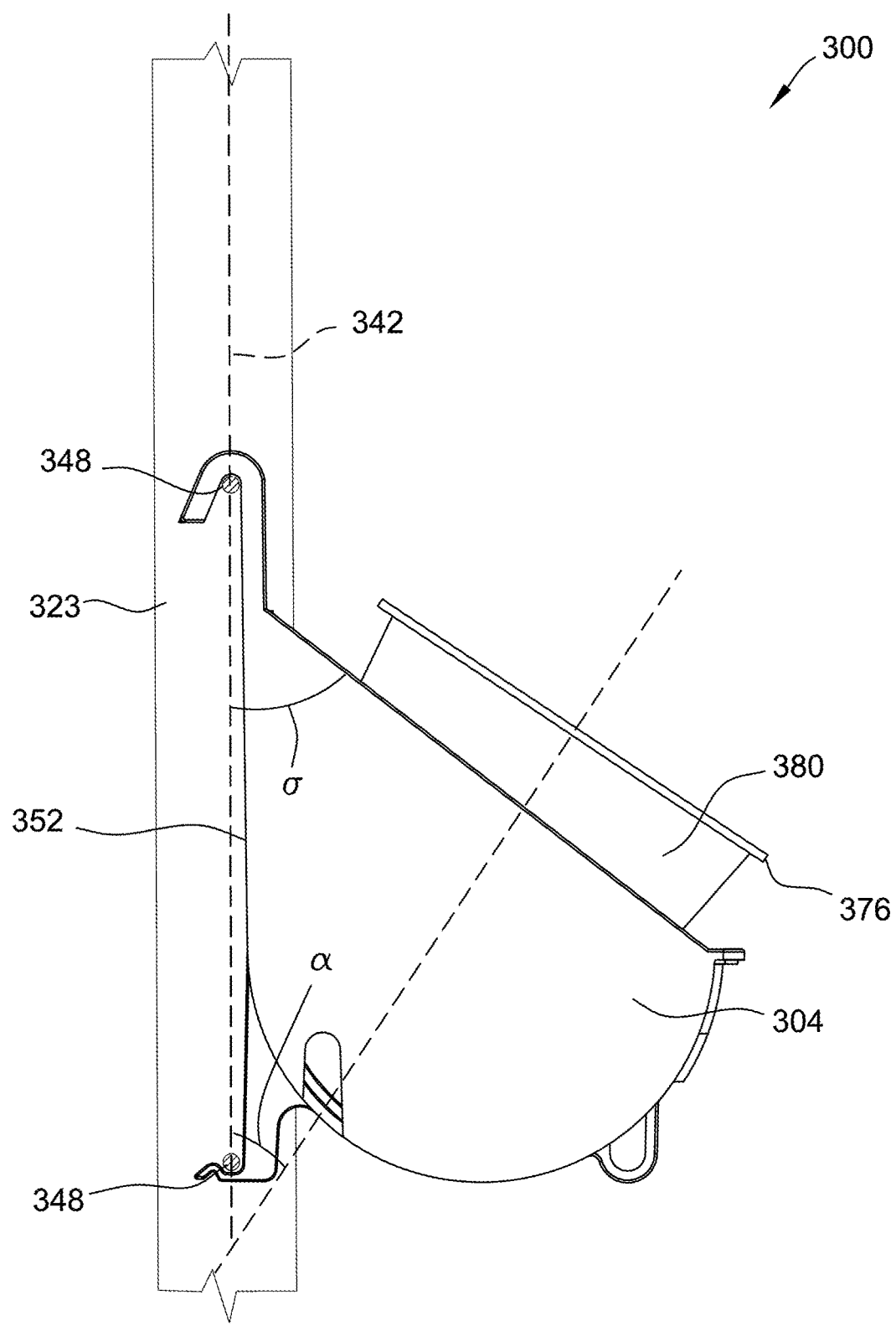
FIG. 17 is an enlarged, cross section of a portion of the vertical growing system of FIG. 14 taken along the line 17-17 shown in FIG. 15.

Referring to FIG. 17, similar to the mounting trays 104 described above with respect to FIGS. 1-14, the mounting trays 304 of the illustrated embodiment allow for controlling the outwards orientation of plants on the vertical growing system 100. A longitudinal axis 392 of the chamber 380 is shown extending through the chamber. In the illustrated embodiment, the mounting trays 304 are configured such that the positioning angle σ and the orientation angle α (described above with respect to mounting tray 104 shown in FIGS. 8 and 11) are complementary angles.

Figure 18:
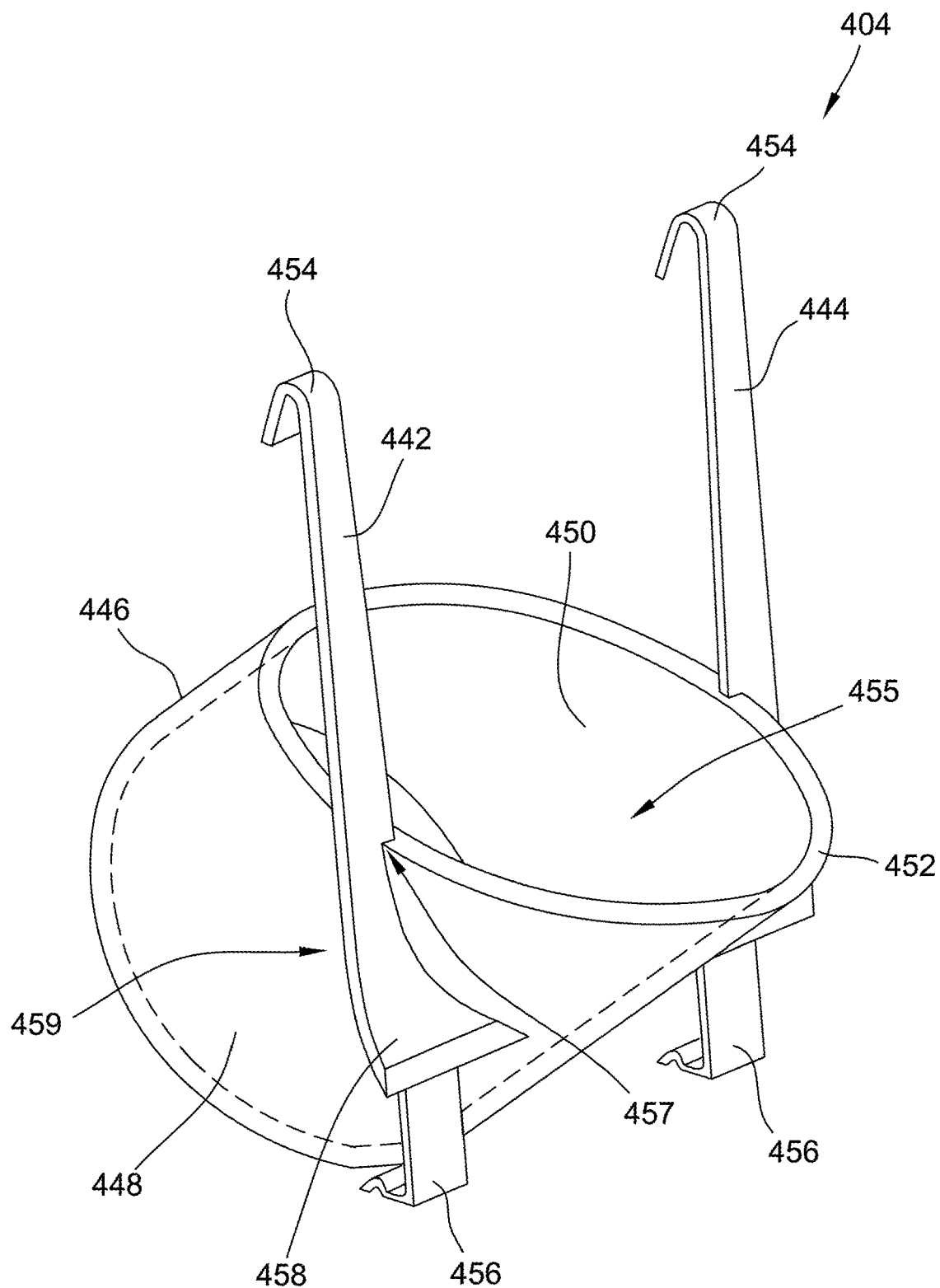
FIG. 18 is a perspective view of another suitable embodiment of a mounting tray for use with the vertical growing systems of FIGS. 1 and 14.

Referring to FIG. 18, another suitable embodiment of a mounting tray 404 for use with the vertical growing systems 100, 300 of FIGS. 1 and 14 is shown. Specifically, the mounting tray 404 of the illustrated embodiment is sized to receive and support a deep sleeve propagation tray (not shown) containing deep rooted plants, therein. For example, and without limitation, in the illustrated embodiment, mounting tray 404 is sized to support fruit and nut trees. In the illustrated embodiment, the mounting tray 404 includes a first arm 442, a second arm 444, and a container 446. The container 446 includes an outer surface 448, an interior surface 450, and a rim 452 between the outer surface 448 and the interior surface 450. The interior surface 450 depends downward from the rim 452 to define a cavity 455 within the container 446. In particular, the cavity 455 of the container 446 is sized for receiving a cylindrical deep sleeve propagation tray (not shown) therein.

In the illustrated embodiment, the first arm 442 and the second arm 444 are each fixedly attached to the outer surface 448 and the rim of the container 446. The arms 442, 444 are configured to support the container 446 on a frame assembly, similar to frame assembly 102 shown in FIG. 1. More specifically, in the illustrated embodiment, the first arm 442 and the second arm 444 each include a hanger 454 extending above the container 446, and a foot 456 extending below the container 446. The hanger 454 and the foot 456 are configured to removably attach the mounting tray 404 to the wire grid 430 of the frame assembly 402 in substantially the same manner as described above with respect to FIGS. 1-14. In other suitable embodiments, an irrigation line receptor (not shown), configured to receive a portion of an irrigation line, may be attached to at least one of the first arm 442 and the second arm 444.

In the illustrated embodiment, the arms 442, 444 each extend downward from the hanger 454 to an arcuate mid-section, indicated generally at 459. The arcuate mid-section 459 is shaped to conform to the outer surface 448 of the container 446, and more specifically, to the portions of outer surface 448 and rim 452 of the container 446 abutting the arms 442, 444. In particular, the arcuate mid-section 459 defines a notch, generally indicated at 457 and includes a sloping surface 458. The rim of the container 446 is at least partially received within the notch 457. The sloping surface 458 extends, in part, along a portion of the curvature of the outer surface 448 of the container 446, and, in part, tangentially to the curvature of the outer surface 448 of the container 446.

In the illustrated embodiment, the arcuate mid-section 459 is configured to provide structural support to the container 446 when the mounting tray 404 is mounted to the frame assembly (not shown). More specifically, the arcuate mid-section 459 facilitates translating downward force on the container 446 to the feet 456 of the mounting tray 404, and thereby to the frame assembly 402 when the feet 456 are attached to the wire grid 430 of the frame assembly 402.

Referring to FIGS. 19-22, another suitable embodiment of a vertical growing system 500 of the present disclosure is shown. In particular, the illustrated embodiment of FIGS. 19-22 is substantially similar to the vertical growing system 300 described above with respect to FIGS. 14-18. The following describes at least some of the differences between the two systems 300, 500.

Figure 19:
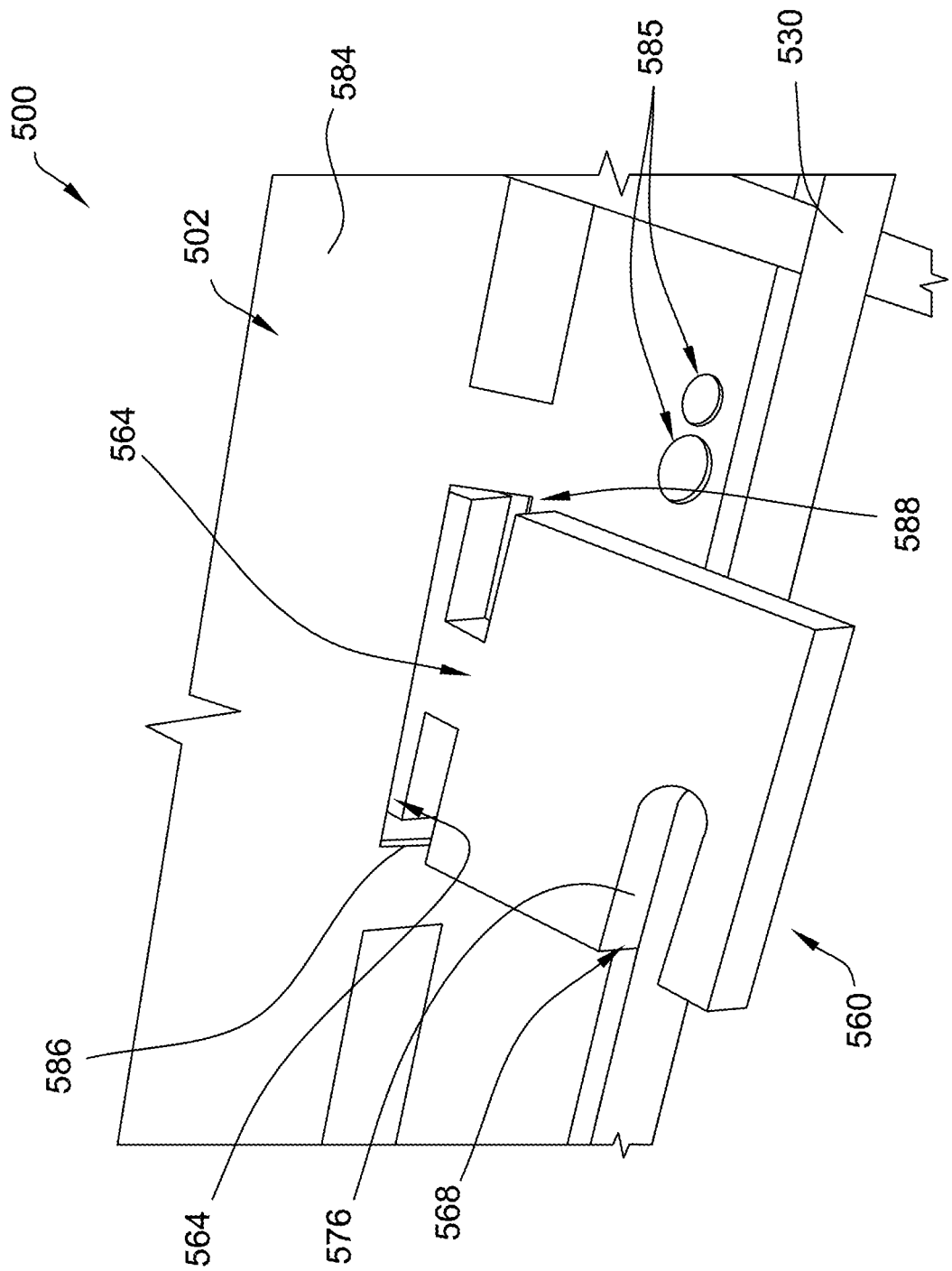
FIG. 19 is an enlarged perspective view of a portion of another suitable embodiment of a vertical growing system of the present disclosure showing a support key in a first position.

Referring to FIG. 19, in the illustrated embodiment, the frame assembly 502 includes a mounting bracket 584, a support key 560, and a wire grid 530. In the illustrated embodiment, the mounting bracket 584 is configured to be fixedly mounted to a vertical wall (not shown). In particular, the mounting bracket 584 includes bolt holes, indicated generally at 585, sized to receive a bolt (not shown) therethrough for mounting the mounting bracket to a vertical wall. The mounting bracket 584 further includes a body 586 that defines a transverse aperture, indicated generally at 588, through the body 586. The mounting bracket 584 is configured to attach to the wire grid 530 by the support key 560 to support the wire grid 530 on the vertical wall.

Figure 21:
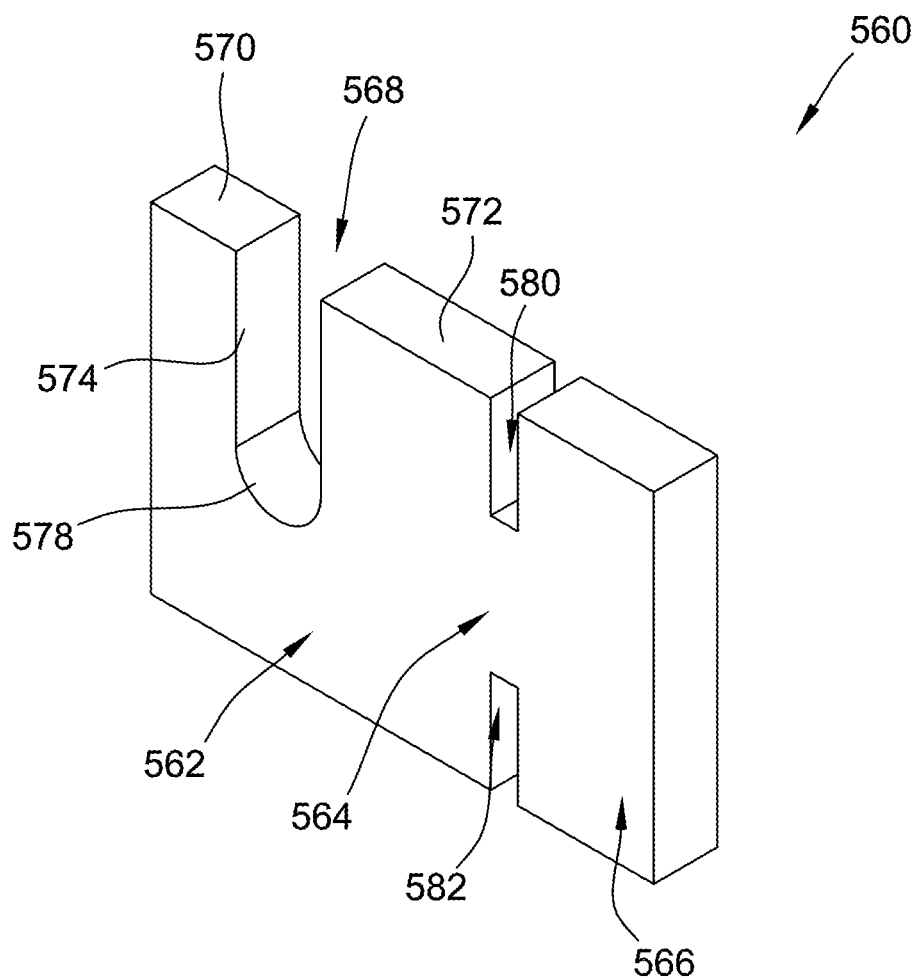
FIG. 21 is a perspective view of the support key of FIG. 19.

Referring to FIG. 21, in the illustrated embodiment, the support key 560 includes a body, indicated generally at 562, a head, indicated generally at 566, and a neck, indicated generally at 564, connecting the head to the neck.

In the illustrated embodiment, the body 562 defines a slot indicated generally at 568. More specifically, the body 562 includes a first top surface 570, a second top surface 572, a first interior sidewall 574 and a second interior sidewall 576. The first interior sidewall 574 is transversely oriented to the first top surface 570 and extends downward therefrom to a concave interior surface 578. The concave interior surface 578 extends to the second interior sidewall 576 which extends to the second top surface 572. The first interior sidewall 574, concave interior surface 578, and the second interior surface 576, collectively define the slot 568 therebetween. In particular, the slot 568 is sized to receive at least a portion of a transversely extending wire 548 (shown in FIGS. 19 and 20).

In the illustrated embodiment, a first notch, indicated generally at 580 and a second notch, indicated generally at 582 are defined collectively between the body 562, the neck 564, and the head 566 of the support key 560. As described in greater detail with respect to FIGS. 21 and 21, the first notch 580 and the second notch 582 are each sized to receive a portion of the frame assembly 102 therein.

Figure 22:
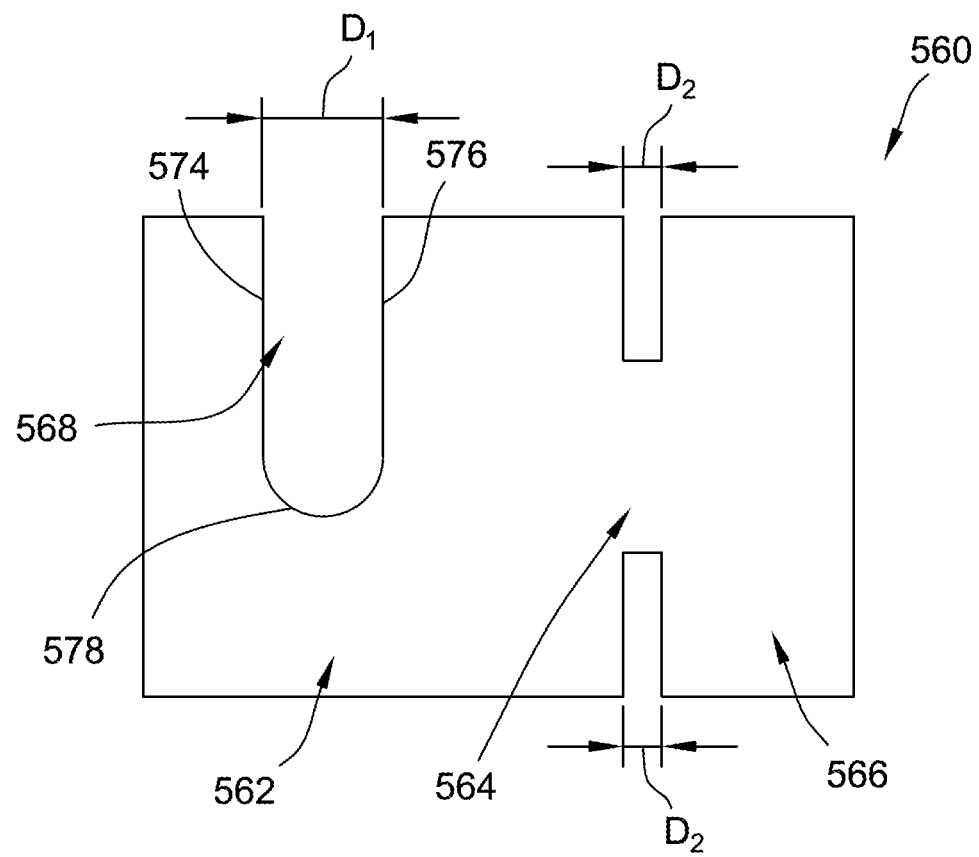
FIG. 22 is a side view of the support key of FIG. 19.

Referring to FIG. 22, the first interior sidewall 574 is spaced from the second interior sidewall 576 a first distance, indicated generally at $D_1$. The body 562 of the support key 560 is spaced from the head 566 of the support key 560 a second distance, indicated generally at $D_2$. In the illustrated embodiment, the first interior sidewall 576 is spaced from the second interior sidewall 578 a greater distance $D_1$ than the distance $D_2$ at which the body 562 of the support key 560 is spaced from the head 566 of the support key 560. In other suitable embodiments, the body 562, the neck 564, and the head 566 of the support key 560 may be configured in any manner that enables the support key 560 to function as described herein.

In the illustrated embodiment, the support key 560 is unitarily formed as a single piece. In particular, in the illustrated embodiment, the support key 560 is machined from a metal or metal based material. In other embodiments, the support key 560 is formed of any suitable material that enabled the support key 560 to function as described herein. For example, and without limitation, in some suitable embodiments, the support key 560 is formed of an injection molded plastic.

Referring back to FIG. 19, in the illustrated embodiment the support key 560 is shown in a first position relative to the mounting bracket 584. The illustrated support key 560 is configured to engage the mounting bracket 584 to support the wire grid 530 on the vertical wall. More specifically, in the illustrated embodiment, the support key 560 is configured to be attached to the mounting bracket 584 by orienting the support key 560 relative to the mounting bracket 584 in an insertion position, such that the head 566 of the support key 560 is aligned with the aperture 588. The head 566 may then be inserted into the aperture 588 of the mounting bracket 584 until the neck 564 is aligned with the body 586 of the mounting bracket 584.

Figure 20:
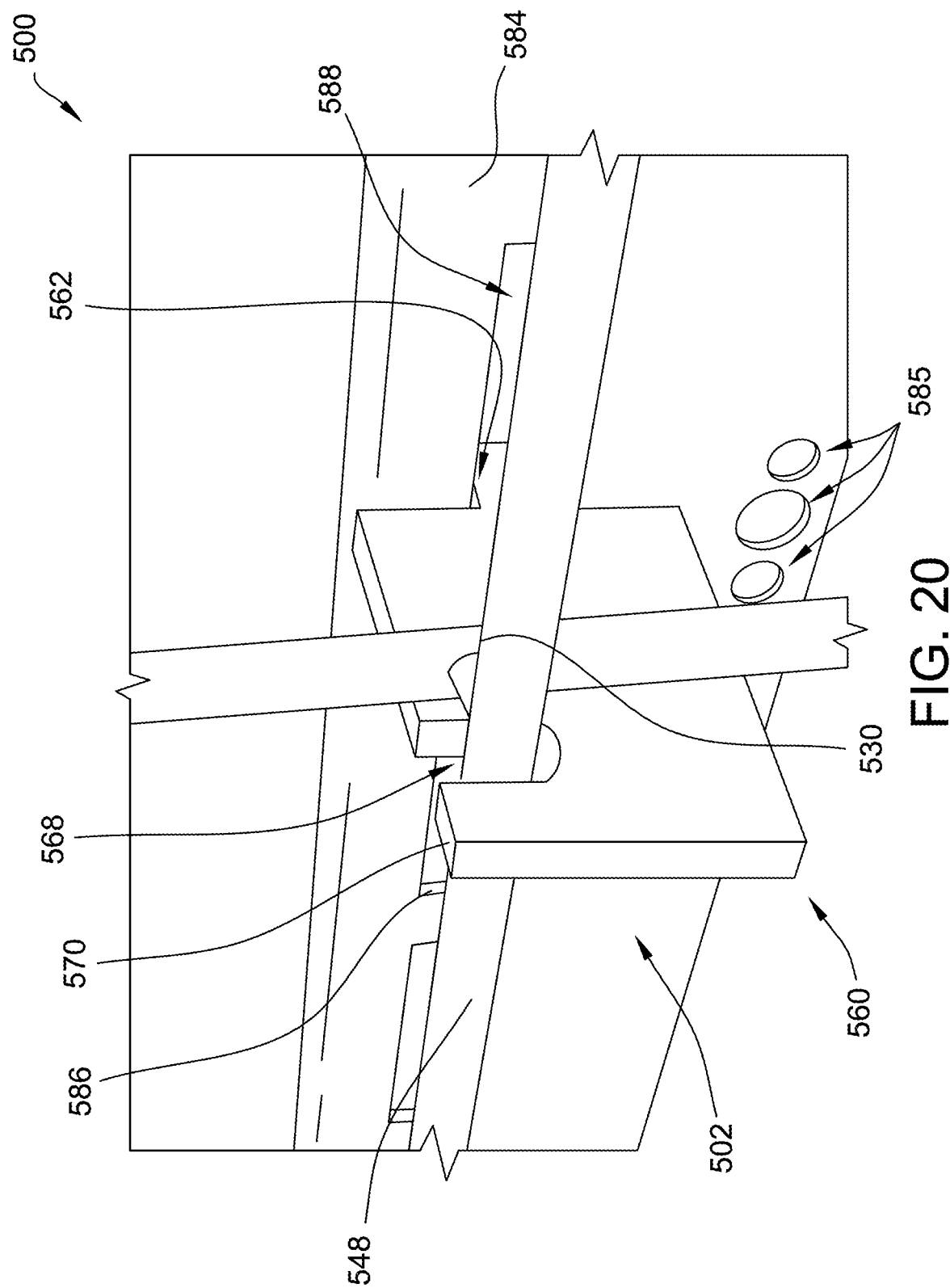
FIG. 20 is an enlarged perspective view of the vertical growing system of FIG. 21 illustrating the support key in a second position.

As shown in FIG. 20, when the neck 564 is aligned with the body 562 of the mounting bracket 584, the neck 564 may be rotated 90 degrees into a support position such that that the first top surface 570 of the support key 560 is positioned vertically above the aperture 588 in the mounting bracket 584. More specifically, in the illustrated embodiment, the support key 560 is sized such that the second distance $D_2$ (shown in FIG. 22) may receive a portion of the body 586 of the mounting bracket 584 within the first and second notches 580, 582 to facilitate rotating the neck 564 within the aperture 588 of the mounting bracket 584. When the support key 560 is aligned in the support position, a portion of one of the transversely extending wires 548 of the wire grid 530 may be placed within the slot 568 defined in the body 562 of the support key 560.

Figure 23:
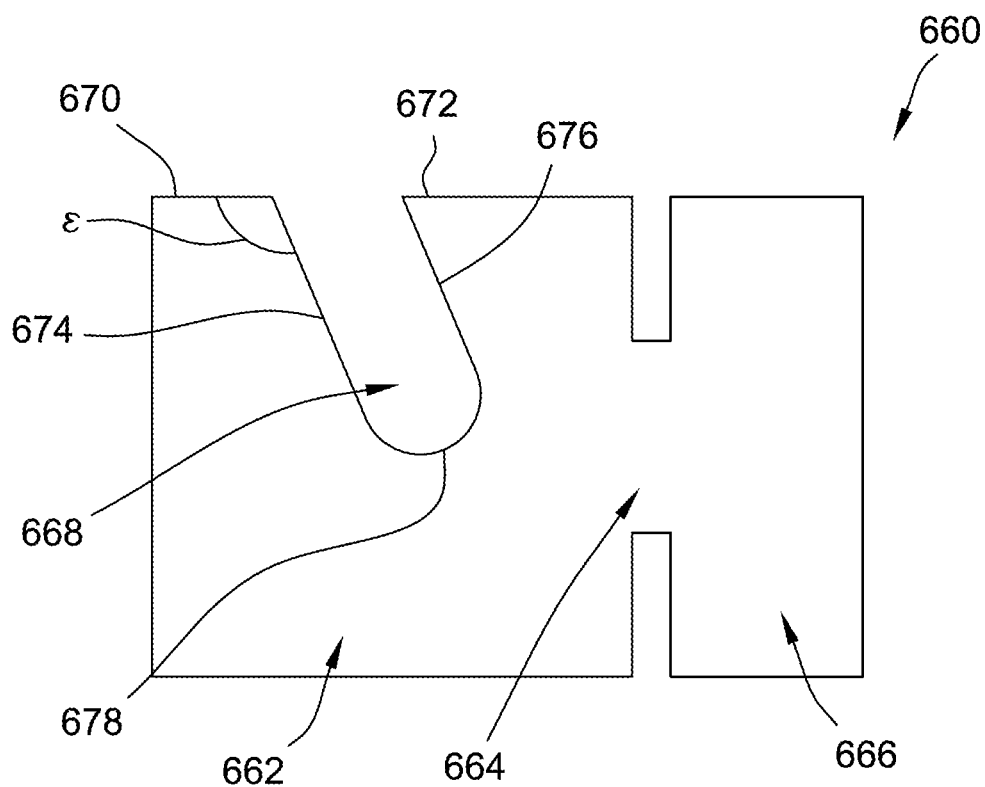
FIG. 23 is a side view of another suitable embodiment of a support key for use in the vertical growing system of FIG. 19.

Referring to FIG. 23, another suitable embodiment of a support key 660 is shown. In particular, the illustrated embodiment of FIG. 23 is substantially similar to the support key 560 described above with respect to FIGS. 19-22. The following describes at least some of the differences between the two support keys 560, 660.

In the illustrated embodiment, the support key 660 includes a body, indicated generally at 662, a head, indicated generally at 666, and a neck, indicated generally at 664, connecting the head 566 to the neck 564. The body 662 defines a slot indicated generally at 668. More specifically, the body 662 includes a first top surface 670, a second top surface 672, a first interior sidewall 674 and a second interior sidewall 676.

In the illustrated embodiment, the first interior sidewall 674 is oriented at an oblique angle, generally indicated at C to the first top surface 670 and extends downward therefrom to a concave interior surface 678. The concave interior surface 678 extends to the second interior sidewall 676 which extends to the second top surface 672 and is oriented generally parallel to the first interior sidewall 674. The first interior sidewall 574, concave interior surface 678, and the second interior surface 676, collectively define the slot 668 therebetween. Accordingly, in the illustrated embodiment, the slot 668 is obliquely oriented at the angle s relative to the first top surface 670. In other suitable embodiments, the slot 668 may be oriented at any angle relative to the first top surface 670 that enables the support key 660 to function as described herein.

As a result of the oblique orientation of the slot 668, in the illustrated embodiment, the first sidewall 674 and the second sidewall 676 may each engage and support at least a portion of transversely extending wires (similar to transversely extending wire 548 shown in FIG. 20) in the slot 668 in various positions, depending on the configuration of the transversely extending wire. For example, in the illustrated embodiment, at least in part due to the oblique orientation of the first sidewall 674, the first sidewall 674 may provide an upward force on a transversely extending wire received within the slot 668 when the transversely extending wire does not contact the interior surface 678.

Figure 24:
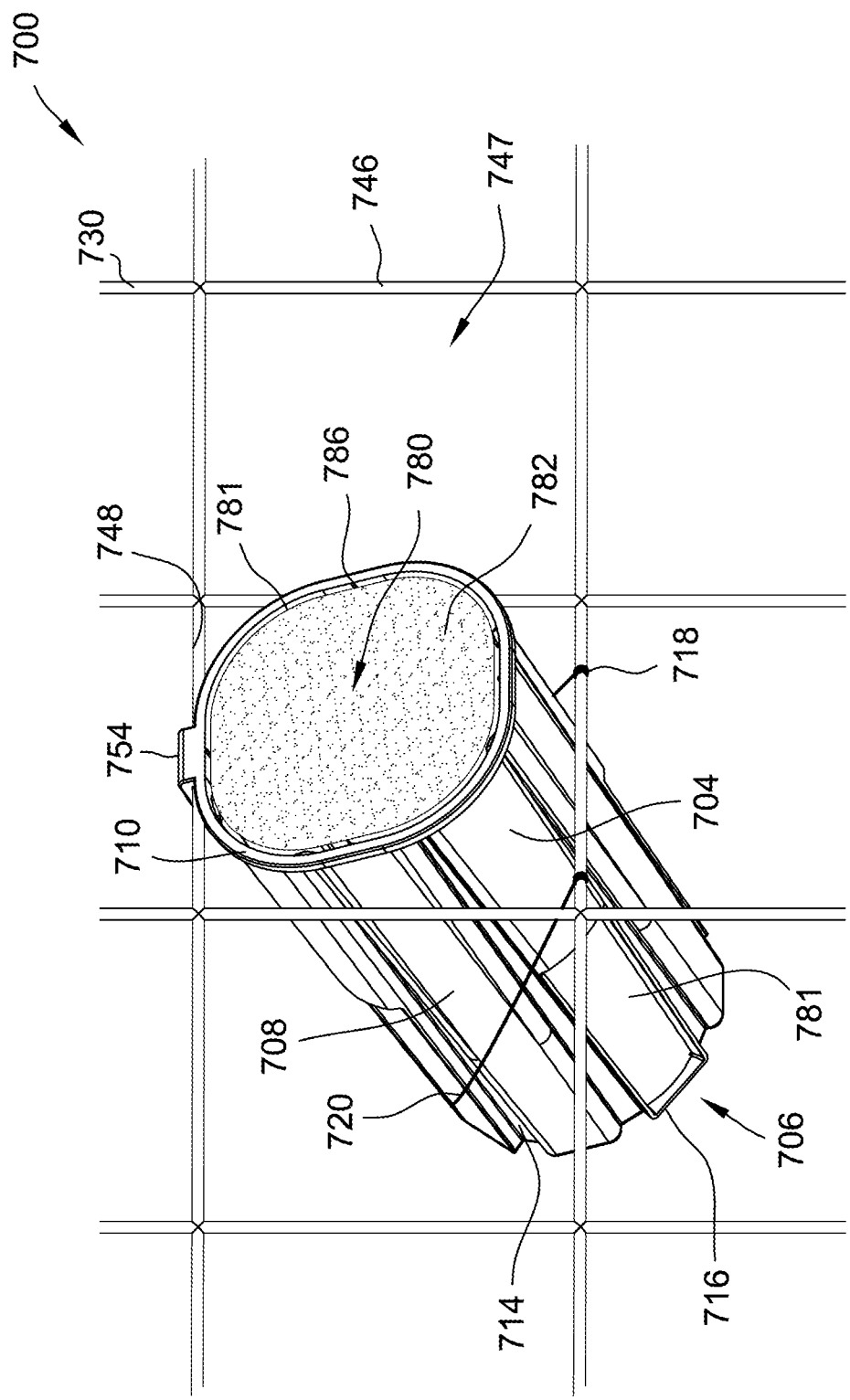
FIG. 24 is a perspective view of a portion of another suitable embodiment of a vertical growing system of the present disclosure including another suitable embodiment of a mounting tray.
Figure 25:
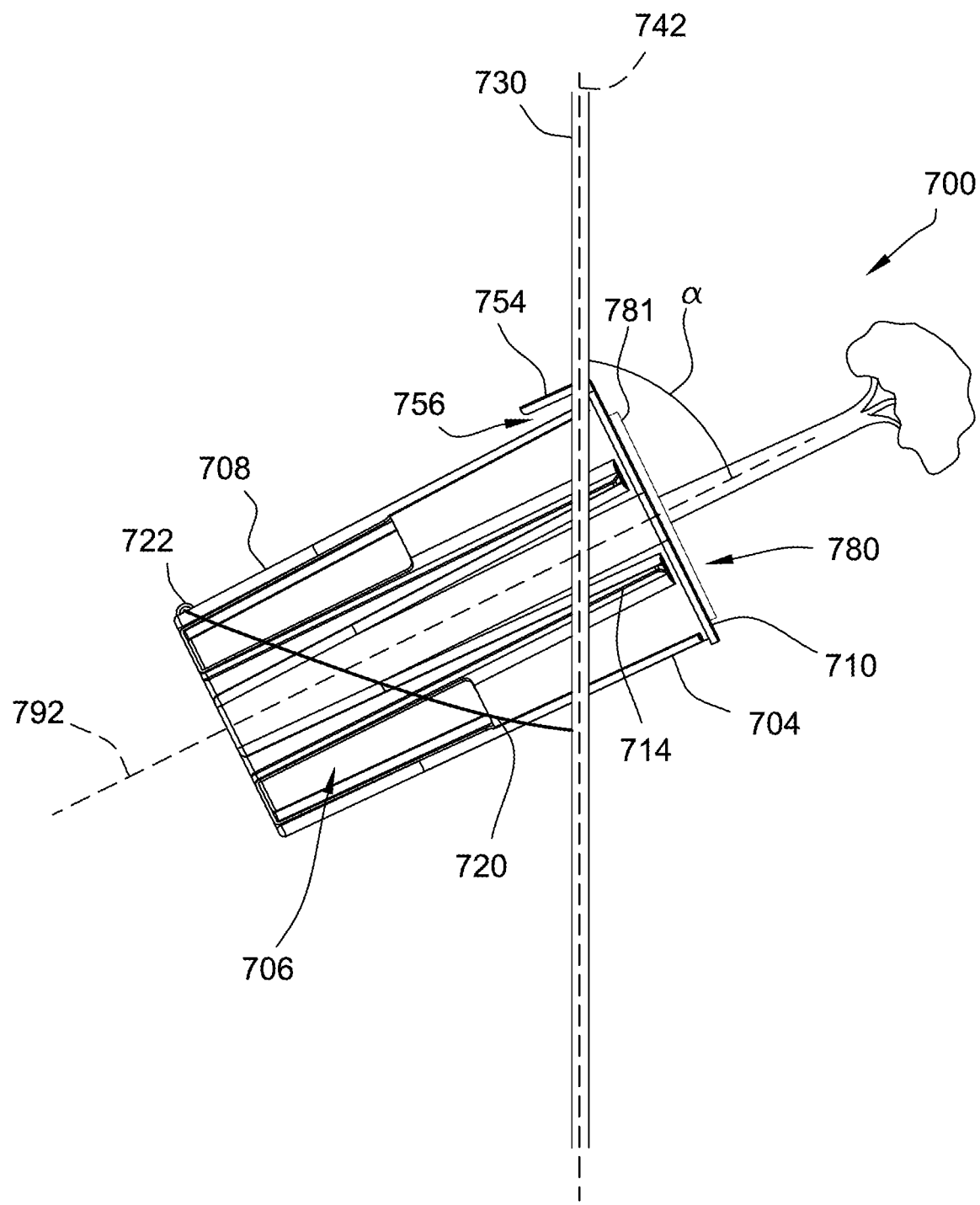
FIG. 25 is a side view of the vertical growing system shown in FIG. 24.

FIG. 24 is a perspective view of a portion of another suitable embodiment of a vertical growing system 700 of the present disclosure including another suitable embodiment of a mounting tray 704. FIG. 25 is a side view of the vertical growing system 700 shown in FIG. 24. In particular, the mounting tray 704 of illustrated embodiment of FIG. 24 is substantially similar to the mounting tray 404 described above with respect to FIG. 18. The following describes at least some of the differences between the two mounting trays 404, 704. Specifically, similar to mounting tray 404, in the illustrated embodiment, the mounting tray 704 is sized to receive and support deep rooted plants (shown in FIG. 25), therein. For example, and without limitation, in the illustrated embodiment, mounting tray 704 is sized to support fruit and nut trees. However, in contrast with the mounting tray 404 (shown in FIG. 18), the mounting tray 704 of the illustrated embodiment is a deep sleeve propagation air tray configured to receive plant growth directly therein. For example, and without limitation, the mounting tray 704 is configured to receive propagation media 782 contained within a propagation paper 781 directly therein. In other words, in the illustrated embodiment, the mounting tray 704 is configured to function as both a mounting tray and a propagation tray, as described with respect to the above embodiments.

In the illustrated embodiment, the mounting tray 704 is generally cylindrical and includes a body 708 extending from a rim 710 to a bottom 716 of the mounting tray. The rim 710 defines, at least in part, a chamber 780 within the body 708 of the mounting tray 704 for receiving a plant therein. Referring to FIG. 25, a longitudinal axis 792 of the chamber 780 is shown extending through the bottom 716. A plurality of air vent apertures, indicated generally at 706, are defined within the body 708 and are configured to facilitate air circulation through the propagation media 782 received within the mounting tray 704. In the illustrated embodiment, the mounting tray 704 is formed of plastic. In alternative embodiments, the mounting tray 704 may be formed of any suitable material that enables the mounting tray to function as described herein.

In the illustrated embodiment, the mounting tray 704 includes a hanger 754 for removably attaching the mounting tray to a wire grid 730 of the vertical growing system 700. More specifically, in the illustrated embodiment, the wire grid 730 includes transversely extending wires 748 and longitudinally extending wires 746 arranged in a grid formation and defining a plurality of apertures 747 therebetween. The mounting tray 704 is mounted to a transversely extending wire 748 of the wire grid 730 such that at least a portion of the mounting tray extends through one of the apertures 747.

In the illustrated embodiment, clips 718 are removably attached to the transversely extending wire 748 and are each attached to a strap 720. In particular, in the illustrated embodiment, the strap 720 engages the mounting tray 704 to secure the mounting tray to the wire grid 730 and inhibit rotation of the mounting tray about the transversely extending wire 748 that may be caused by a heavy top growth within the mounting tray. In particular, referring to FIG. 25, in the illustrated embodiment, the mounting tray 704 includes a ring 722 mounted to the body 708. The strap 720 extends from the clip 718 (shown in FIG. 24) around the body 708 through the ring 722 and to another clip 718 attached to the transversely extending wire 748 on an opposite side of the mounting tray 704. In the illustrated embodiment, the strap 720 is sized to be in tension such that the strap inhibits clockwise rotation (as viewed in FIG. 25) of the mounting tray 704 about the wire grid 730. In alternative embodiments, the strap 720 may be adjustable to allow for selective control, at least in part, of the orientation angle, generally indicated at α, of the chamber 780 relative to the longitudinal axis 742 of the wire grid 730.

In addition, in the illustrated embodiment, the wire grid 730 is sized such that a transversely extending wire 748, located vertically below the transversely extending wire 748 engaging the hanger 754, engages the body 708 when the mounting tray 704 is mounted to the wire grid. In particular, the transversely extending wire 748 engages the body 708 to inhibit, at least in part, counter-clockwise rotation (as viewed in FIG. 25) of the mounting tray 704 about the wire grid 730. In other words, the wire grid 730 may be sized to control, at least in part, of the orientation angle α of the chamber 780 relative to the longitudinal axis 742 of the wire grid.

Figure 26:
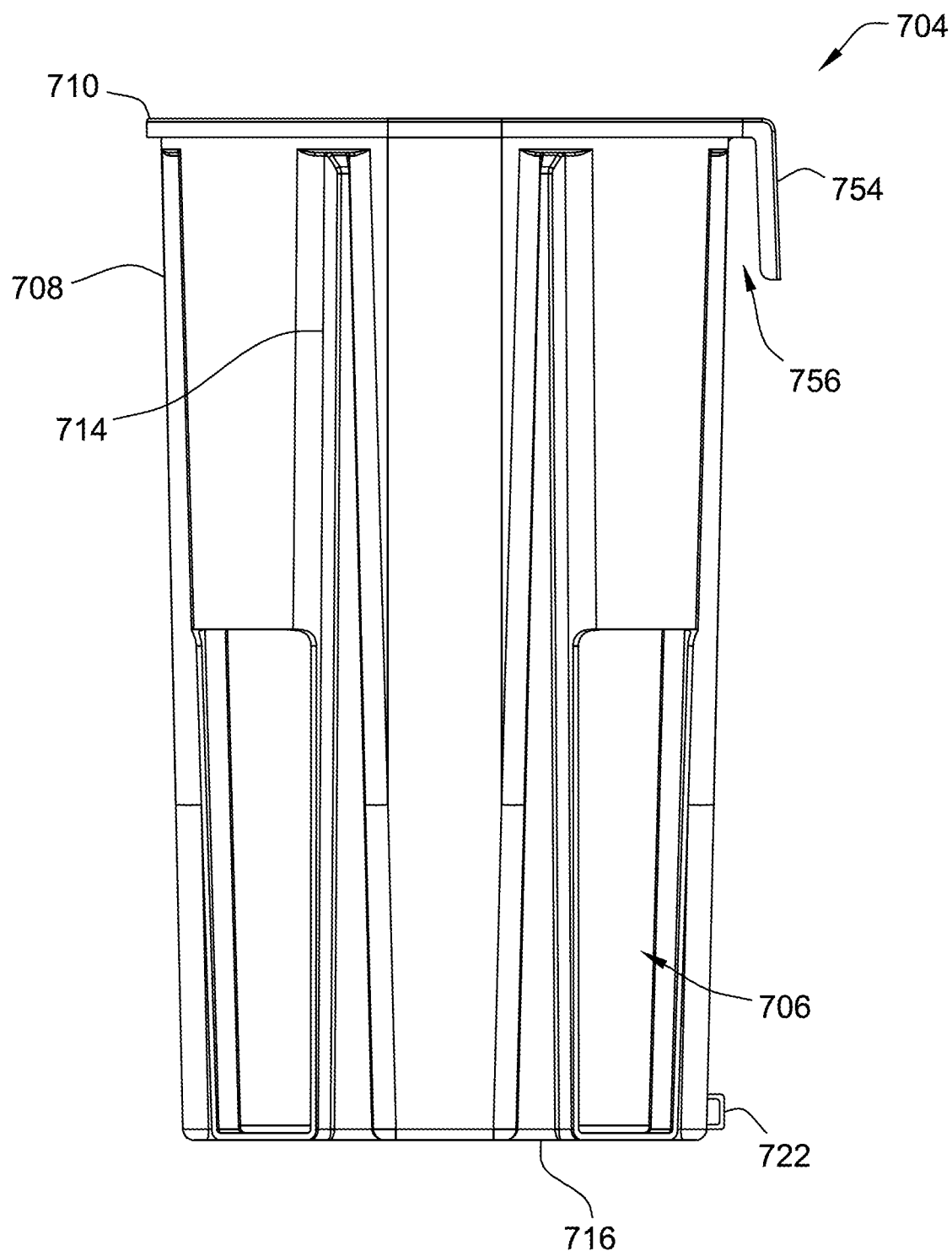
FIG. 26 is a side view of the mounting tray shown in FIG. 24.
Figure 27:
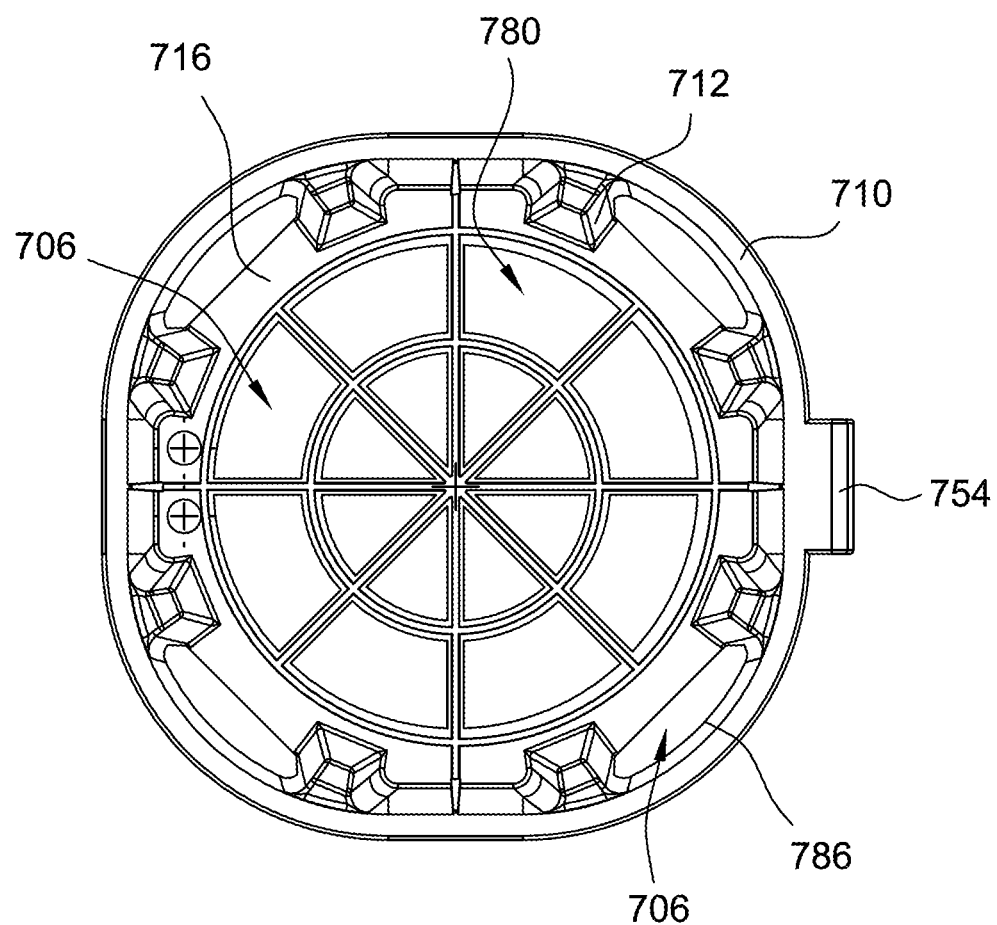
FIG. 27 is a top view of the mounting tray shown in FIG. 25.

FIG. 26 is a side view of the mounting tray 704 shown in FIG. 24. FIG. 27 is a top view of the mounting tray 704 shown in FIG. 25. Referring to FIG. 26, in the illustrated embodiment, the hanger 754 is integrally formed with the rim 710 and depends therefrom to define a hanger recess 756. In particular, in the illustrated embodiment, the hanger 754 is sized to withstand normal and shear forces acting on the hanger 754 (i.e., resist deformation) when the mounting tray 704 is mounted to the wire grid 730 (shown in FIG. 24) and a deep rooted plant (shown in FIG. 25) is received within the mounting tray. The hanger 754 is also sized such that the hanger recess 756 may receive one of the transversely extending wires 748 of the wire grid 730 (shown in FIG. 25) therein.

In the illustrated embodiment, the body 708 defines a plurality of channels 714 extending longitudinally along the body at least partially between the bottom 716 and the rim 710. The channels 714 further extend, at least in part, radially inward of the rim 710. The ring 722 is fixedly attached to the body 708 adjacent the bottom 716 and extends radially outward from the body. In other suitable embodiments, the ring 722 may be attached to any location of the body 708 that enables the vertical growing system 700 to function as described herein. In further suitable embodiments, the strap 720 (shown in FIG. 25) may be secured to the mounting tray 704 in any manner that enables that mounting tray to function as described herein. For example, and without limitations, in at least some suitable embodiments, the strap 720 is secured to the mounting tray 704 through one of the apertures 706 defined within the body 708. In the illustrated embodiment, the mounting tray 704 includes through-holes 709 (shown in FIG. 27) extending through the bottom 716 of the mounting tray. In at least some suitable embodiments, the strap 720 is secured to the mounting tray 704 through one of through-holes 709.

As best seen in FIG. 27, in the illustrated embodiment, the mounting tray 704 includes an interior wall 786 extending longitudinally within the mounting tray between the rim 710 and the bottom 716. A plurality of projections 712 are circumferentially spaced around the interior wall 786 and project radially inward from the interior wall. In particular, the projections 712 facilitate spacing the propagation media 782 (shown in FIG. 24) from the apertures 706 defined within the body 708 of the mounting tray 704 to improve air circulation through the propagation media.

In the illustrated embodiment, the bottom 716 of the mounting tray 704 includes a plurality of ribs 711. Specifically, in the illustrated embodiment, the ribs 711 each extend one of circumferentially and radially along the bottom 716 and define base apertures 707 therebetween. The base apertures 707 facilitate providing air circulation upwards through the chamber 780 between the projections 712. In further suitable embodiments, base apertures 707 may be covered to provide a base (not shown) between the ribs 711. For example, and without limitation, in some suitable embodiments, the base apertures 707 are each covered by any material suitable to inhibit fluid flow through the base aperture. In such embodiments, the ribs 711 each define recesses therebetween for collecting moisture in a substantially similar manner as described above with respect to ribs 226 (shown in FIG. 9). In other suitable embodiments, any one of the base apertures 707 may be open to facilitate air circulation therethrough and any one of base apertures may be covered to collect moisture. In further suitable embodiments, the mounting tray 704 may be configured in any manner that enables the vertical growing system 700 to function as described herein.

Referring now to FIGS. 28-31, another suitable embodiment of a tray assembly 800 for use with the vertical growing systems 100, 300 of FIGS. 1 and 14 is shown. In the illustrated embodiment, the tray assembly 800 includes a mounting tray 802 and a propagation tray 804 that is selectively received within the mounting tray 802. The tray assembly 800 is substantially similar to the tray assembly 174, shown in FIG. 6, except for the differences described below.

Figure 28:
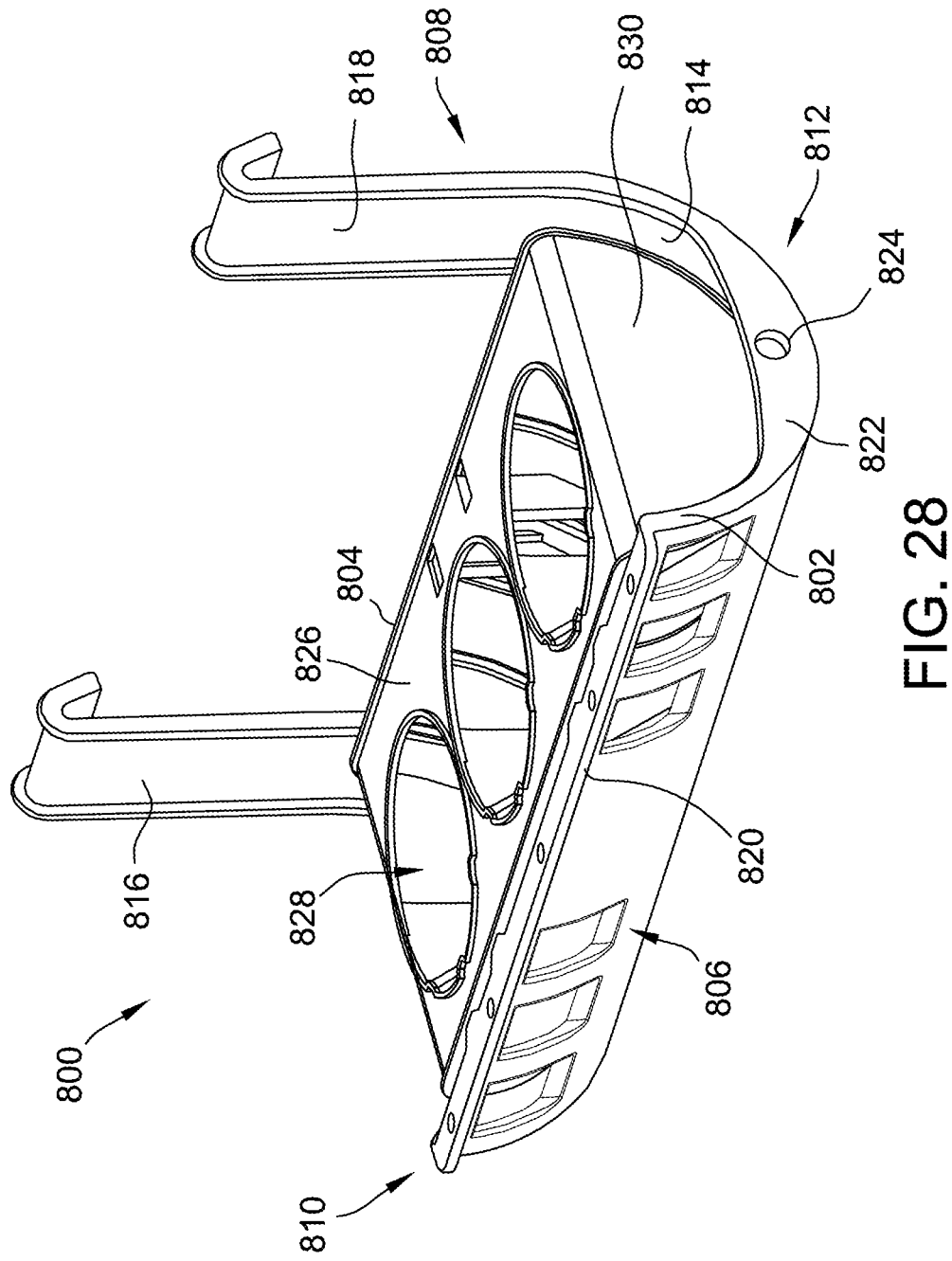
FIG. 28 is a perspective view of another suitable embodiment of a tray assembly for use with the vertical growing systems of FIGS. 1 and 14.

Referring to FIG. 28 in particular, in the illustrated embodiment, the mounting tray 802 includes a front, generally indicated at 806, a rear generally indicated at 808, a first end, generally indicated at 810, and a second end, generally indicated at 812, opposite the first end 810. The mounting tray 802 further includes a concave interior surface 814 extending from the rear 808 of the mounting tray 802 to the front 806 of the mounting tray 802. The mounting tray 802 further includes a first hanger 816 located adjacent the first end 810 and extending vertically upward from the concave interior surface 814 at the rear 808 of the mounting tray 802. The mounting tray 802 further includes a second hanger 818 located adjacent the second end 812 and extending vertically upward from the concave interior surface 814 at the rear 808 of the mounting tray 802.

In the illustrated embodiment, the concave interior surface 814 terminates at the front 806 of the mounting tray 802 at a lip 820 defined in the front 806 of the mounting tray 802. A first end wall (not shown) is located at the first end 810 of the mounting tray 802 and extends between the lip 820 and the first hanger 816. A second end wall 822, is sized substantially similar to the first end wall (not shown) and is located at the second end 812 of the mounting tray 802 and extends between the lip 820 and the second hanger 818. In the illustrated embodiment, the first end wall and the second end wall 822, which are substantially the same, each define an irrigation aperture, generally indicated at 824, sized to receive an irrigation line (e.g., a drip line) therethrough.

In the illustrated embodiment, the propagation tray 804 is formed of an injection molded plastic. In other embodiments, the propagation tray 804 may be formed of any suitable material that enables the propagation tray 804 to function as described herein. For example, and without limitation, in some embodiments, the propagation tray 804 is formed of cardboard.

In the illustrated embodiment, the propagation tray 804 includes a generally planar top face 826 and a plurality of chambers, generally indicated at 828, defined in the top face 826 and extending therefrom toward the interior surface 814 of the mounting tray 802. In particular, the illustrated embodiment, the propagation tray 804 includes three chambers 828, each sized to receive a respective propagation medium (not shown), similar to propagation medium 182 shown in FIG. 6, within the chambers 828. In other suitable embodiments, the propagation tray 804 may include any number of chambers 828 that enables the propagation tray 804 to function as described herein.

In the illustrated embodiment, the propagation tray 804 further includes end fins 830 positioned adjacent the first end 810 the second end 812 of the mounting tray 802. The end fins 830 extend from the top face 826 to contact the interior surface 814 of the mounting tray 802, thereby supporting the propagation tray 804 on the mounting tray. In the illustrated embodiment, the end fins 830 each include a curved edge 836 and the end fins are generally semi-circular in shape. In other embodiments, the end fins 830 are shaped in any manner that enables the propagation tray 804 to function as described herein.

Figure 29:
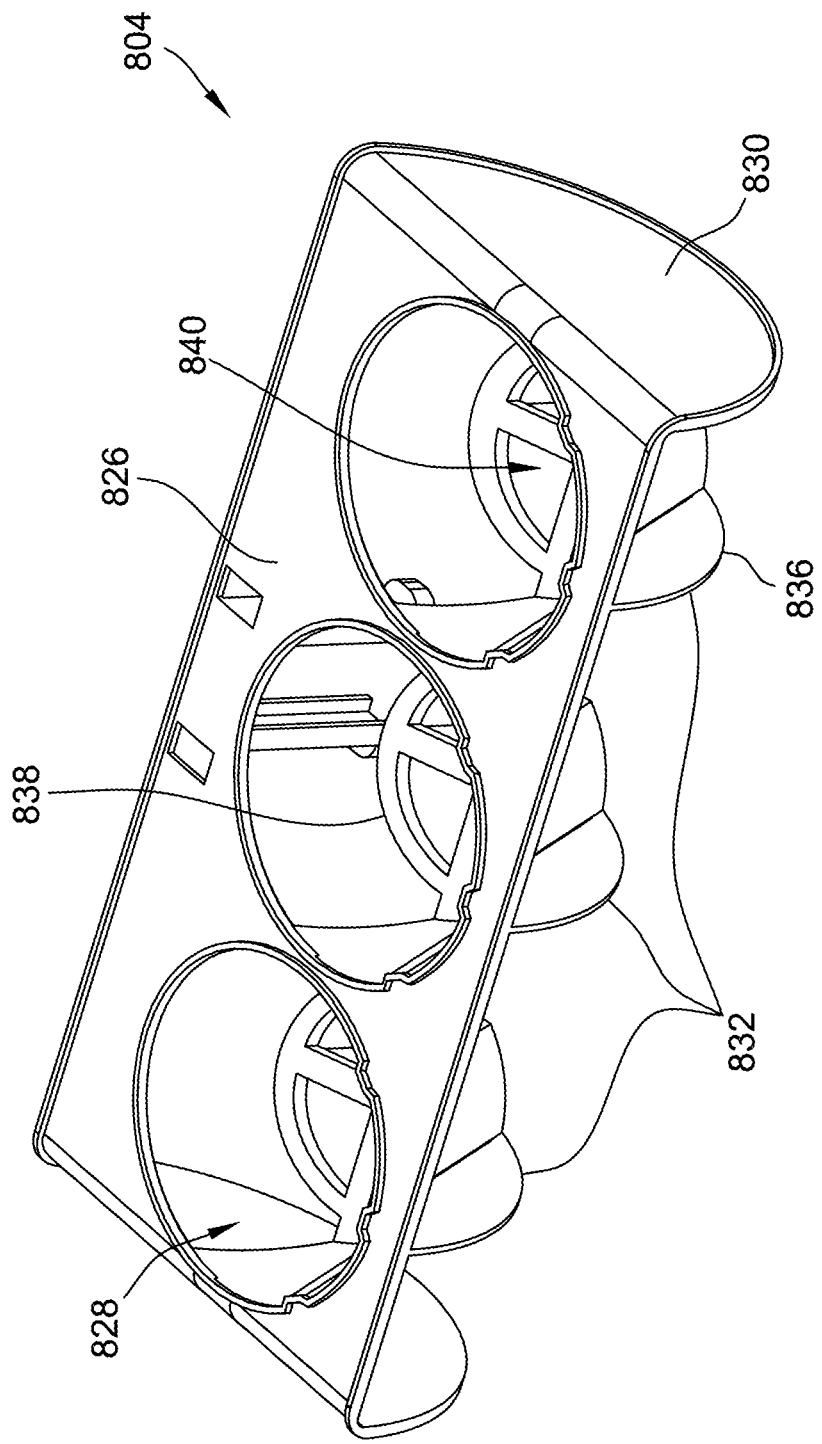
FIG. 29 is a front perspective view of the propagation tray of the tray assembly shown in FIG. 28.
Figure 30:
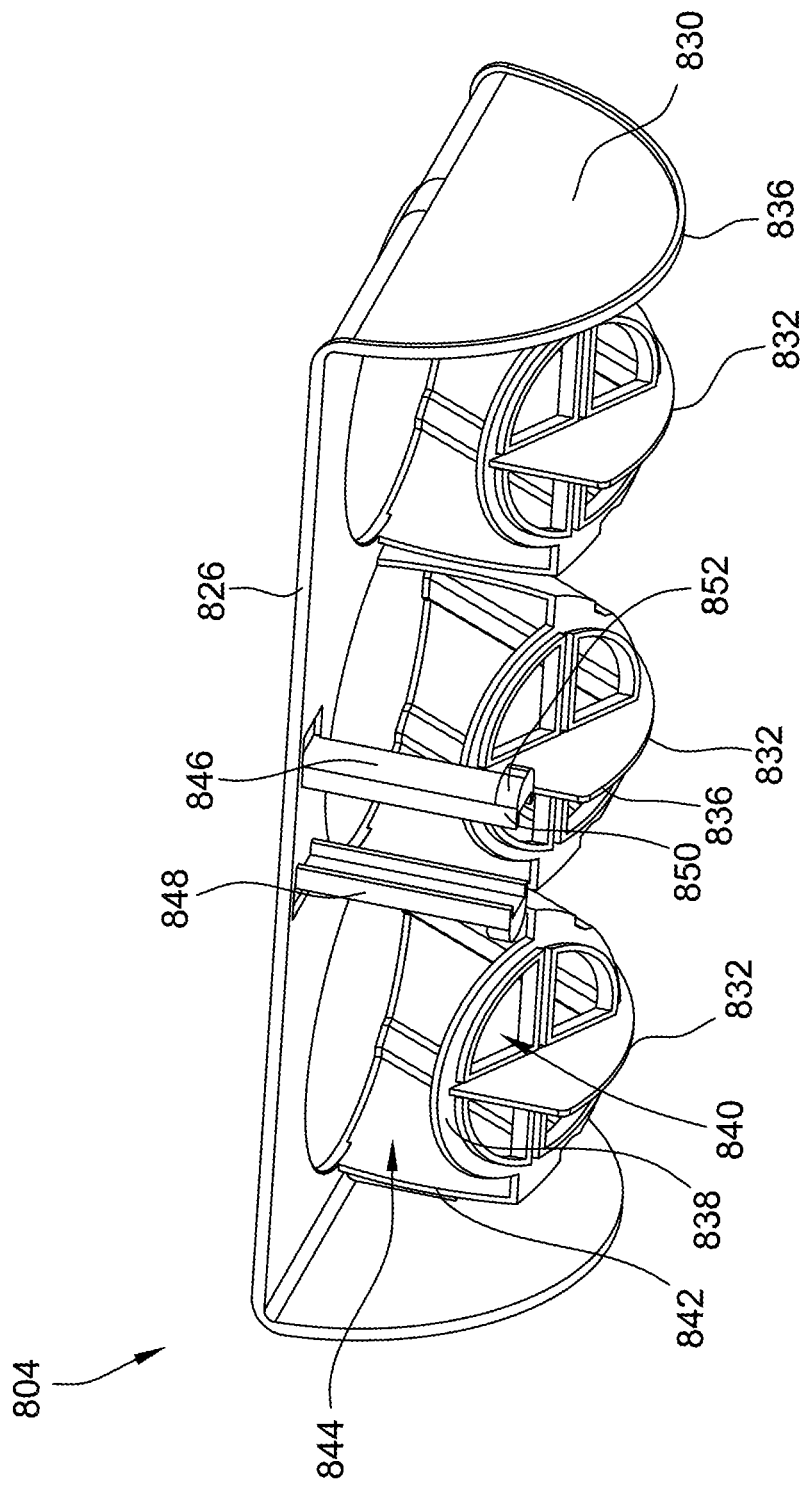
FIG. 30 is a rear perspective view of the propagation tray shown in FIG. 29.

Referring to FIGS. 29 and 30, in the illustrated embodiment, each chamber 828 further includes a chamber fin 832 extending outward from the chambers 828 and each having a curved edges 836. In the illustrated embodiment, the curved edges 836 of each of the end fins 830 and chamber fins 832 (more broadly, the positioning members) are shaped substantially complimentary to the curvature of the interior surface 814 of the mounting tray 802 (shown in FIG. 28) to orient and support the propagation tray 804 within the mounting tray 802. More specifically, as described in greater detail below with respect to FIG. 31, in the illustrated embodiment, the end fins 830 and the chamber fins 832 are configured to orient the chambers 828 of the propagation tray 804 obliquely relative to the longitudinal axis 142, 342 (shown in FIGS. 5 and 17) of the wire grid 403 when the propagation tray 804 is received within the mounting tray 802 and the mounting tray is coupled to the wire grid. In other embodiments, the propagation tray 804 may include any positioning member to facilitate orienting the top face 826 and/or the chambers 828 of the propagation tray within the mounting tray 802. For example, and without limitation, in some embodiments, the propagation tray 804 includes a single positioning member (not shown) configured to orient the propagation tray obliquely relative to the longitudinal axis 142, 342 (shown in FIGS. 5 and 17).

In the illustrated embodiment, the chambers 828 each include a base 838 configured to support the propagation medium (similar to propagation medium 182 shown in FIG. 6) within the chambers. The base 838 defines base apertures 840 extending through the propagation tray 804 such that the chamber 828 is in fluid communication, via the base apertures, with air and/or irrigation fluid in the mounting tray 802 (shown in FIG. 28). Moreover, referring to FIG. 30, in the illustrated embodiment the chambers 828 each include a sidewall 842 extending downward from the top face 826 to the base 838 of the chamber 828. In the illustrated embodiment, the sidewalls 842 of each of the chambers 828 extend only partially around the full circumferences of the respective bases 838, thereby defining rear apertures 844. The rear apertures 844 enable fluid communication between propagation medium (shown in FIG. 6) received within the chambers 828 along the heights of the propagation medium.

In the illustrated embodiment, the propagation tray 804 further includes a pair of snap arms 846 including a body 848 extending generally transversely from the top face 826 to a distal end 850 (FIG. 30). The snap arms 846 further each include a plug 852 protruding generally transversely outward from the bodies 848 at the distal ends 850. In the illustrated embodiment, the snap arms 846 are resiliently flexible towards one another to facilitate a snap fit between the plugs 852 of the arms 846 and a corresponding notch (not shown) defined in the mounting tray 802 (shown in FIG. 28). Thus, in the illustrated embodiment, the snap arms 846 facilitate releasably securing the propagation tray 804 to the mounting tray 802. In other embodiments, the propagation tray 804 does not include snap arms 846. In further embodiments, the propagation tray 804 may include any feature that releasably secures the propagation tray 804 to the mounting tray 802. For example, and without limitation, in some embodiments, the propagation tray 804 includes a notch (not shown) at the front of the top face 826 sized to engage the lip 820 (shown in FIG. 28) of the mounting tray 802 to inhibit rotation and/or misalignment of the propagation tray 804 within the mounting tray 802.

Figure 31:
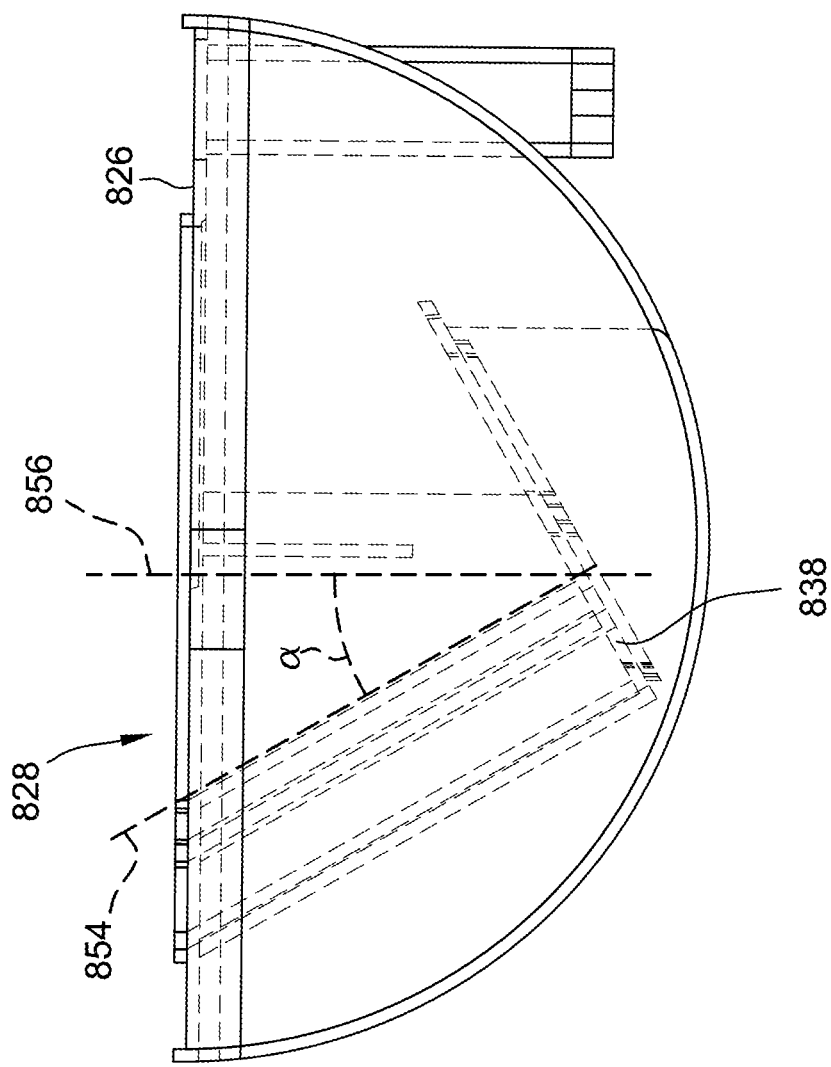
FIG. 31 is a side view of the propagation tray shown in FIG. 29.

In the illustrated embodiment, the chambers 828 of the propagation tray 804 are connected to one another at the top face 826 of the propagation tray 804. In particular, as best shown in FIG. 31, the chamber 828 of the propagation tray 804 defines a longitudinal axis 854 of the chamber 828 shown extending through the base 838. A mounting axis 856 parallel to the longitudinal axis 142 of the wire grid 140 (shown in FIGS. 5 and 17) when the mounting tray 802 is mounted to the wire grid 140, is shown for reference. In the illustrated embodiment, the chambers 828 are each sized and shaped to receive propagation medium 182 (shown in FIG. 6) therein and to orient the propagation medium along the longitudinal axis 854 of the chambers 828. In the illustrated embodiment, the longitudinal axes 854 of the chambers 828 are oriented at an angle, generally indicated at $\alpha$, relative to the mounting axis 856. In some embodiments, the orientation angle $\alpha$ of the chambers 828 of to the mounting axis 856 may be between 15 degrees and 75 degrees. More specifically, in the illustrated embodiment, the orientation angle $\alpha$ of the chambers 828 of the propagation tray 804 to the mounting axis 856 is 45 degrees. In other suitable embodiments, chambers 828 of the propagation tray 804 are oriented at any suitable angle relative to the longitudinal axis 142 of the wire grid 130 (shown in FIGS. 1-5) that enables the propagation tray 804 to function as described herein.

As described above, embodiments of the vertical growing system include a frame assembly and a mounting tray configured to be removably attached to the frame assembly. The mounting tray is configured to receive a propagation tray therein. The propagation tray includes a first chamber for holding a plant. The configuration of the frame assembly, the mounting tray, and the propagation tray facilitates replacement of plants and/or soil within the vertical growing system. Accordingly, the vertical growing system improves the ease of use and reduces maintenance costs associated with maintaining plant growth on the vertical growing system. Furthermore, the mounting trays of the above described embodiments include a positioning member configured to engage the propagation trays and manipulate the orientation of the propagation trays within the mounting trays. Accordingly, the vertical growing system improves the lifespan and health of the plants within the vertical growing system by inhibiting vertically stacked plants from blocking sunlight or airflow to other plants within the vertical growing system.

A selectively configurable vertical growing system (e.g., vertical growing system 100, as shown in FIG. 1) enables the configuration of the growing system to be easily optimized for a variety of applications. Several applications of the selectively configurable vertical growing system are contemplated, to illustrate the advantages of the system.

Overall, the vertical growing system enables propagation trays, and thus plants, to be quickly installed and removed from mounting trays. This reconfiguration is particularly suited for the lifecycle of plants. In one suitable embodiment, immature plants may be started in propagation trays within a greenhouse environment, before the propagation trays (e.g., propagation tray 176, as shown in FIG. 6) are loaded into mounting trays (e.g., first mounting tray 104, as shown in FIG. 6) of a vertical growing system. In another suitable embodiment, a year round display of mature and seasonal plants may be provided by seasonally updating the vertical growing system. In yet another suitable embodiment, plants may be easily removed from the vertical growing system when they have reached the maximum size supported by the frame.

Advantages include rapid installation of the plants in addition to maintaining their root environment and propagation medium. For example, restaurants may use the vertical growing system as a low-maintenance source of fresh herbs and vegetables. As another example, offices may utilize the vertical growing system for unique and refreshing decoration. Propagation trays removed from the growing system, including any plants, may be reused or stored. For example, perennial tulips may be stored until their next annual bloom.

Advantages of the vertical growing system further include selective configuration of the propagation medium. For example, loose soil may be contained in a propagation tray, reducing waste, and preventing the spread of soil-borne plant diseases. Additionally, soilless propagation mediums (e.g., mineral wool) may be combined with traditional mediums in a single vertical growing medium. The propagation medium may be quickly changed using the propagation trays, as shown in, at least, FIG. 6.

Users may request an initial configuration of the vertical growing system. More specifically, users may specify the number of mounting trays, and the size of the mounting trays (e.g., 4 chambers, 5 chambers). Users may also select the style of the frame assembly, as described above. For example, the user may select an angled frame assembly (as shown in FIG. 1), or a vertical frame assembly (as shown in FIG. 14). Further, users may specify the size of the individual chambers of the mounting trays, as shown in FIG. 6. Overall, the vertical growing system is configured to be highly adaptable to the installation plants of users.

In one suitable embodiment, a user places an order for a frame assembly having 5 mounting trays using a website. The frame assembly may be delivered by an installer, or shipped to the user. The frame assembly may then be assembled by the installer, or by the user. For example, the frame assembly may be shipped to the user, before assembly by an installer at the user's location.

In some embodiments, users may further select an initial configuration of plants (e.g., an initial configuration of propagation trays) as part of requesting the initial configuration of the vertical growing system. For example, a user may order a vertical growing system having 5 mounting trays, and additionally order 5 propagation trays including basil plants.

In other words, the first set of propagation trays (e.g., plants) may be provided at substantially the same time as the frame assembly. For example, the propagation trays may be shipped with the frame assembly to the user. Alternatively, the propagation trays may be provided separately from the frame assembly. For example, the frame assembly may be assembled by an installer, before the propagation trays are delivered via parcel service. As another example, the propagation trays may be delivered by the installer at the same time as the frame assembly.

A subscription model is contemplated, to apply the advantages of the selectively configuration growing system. The subscription model includes periodically updating the configuration of the vertical growing system (e.g., providing new propagation trays). More specifically, subscribers (e.g., urban farmers, interior designers, individual home owners, property managers, hospitality services, etc.) may receive a vertical growing system including both propagation and mounting trays, as described above. After the vertical growing system (e.g., the frame assembly and first set of propagation trays) is installed with the subscriber, the subscriber may request updated configurations of the propagation trays (e.g., new sets of propagation trays with new plants) either on a periodic basis or on-demand. Subscribers may then receive additional configurations of the vertical growing system.

It is contemplated that the updates can be on regularly occurring intervals (e.g., daily, monthly, bi-monthly, quarterly, semiannually) or irregularly occurring intervals. For example, a second set of propagation trays (also referred to as a second configuration) may be delivered to the subscriber on a quarterly basis. Additionally or alternatively, a second set of propagation trays may be delivered to the subscriber at irregular intervals, such as, for example, weather-indicated season changes, frost chance threshold, expected plant lifetime, and expected time to deplete edible plants. Additionally or alternatively, a subscriber may place an on-demand request for a second set of propagation trays.

In some embodiments, the vertical growing system may be seasonally updated. Seasonal plants may be started in propagation trays having the appropriate propagation medium (e.g., propagation medium 182, shown in FIG. 6), before being installed in the mounting trays of the vertical growing system. This facilitates the display of mature and seasonal plants year-round in a single vertical growing system, without laborious replanting.

In one suitable embodiment, a vertical growing system is installed in an office. The configuration of the vertical growing system may be periodically updated with seasonal plants. For example, dwarf conifers are seasonally appropriate in the winter, while additionally being festive. Tulips are a traditional spring decoration. However, their relatively short flowering period makes them impractical for year-round displays. More particularly, an updated configuration may be provided in response to a seasonal change in climate. Example seasons include Fall, Spring, Winter, Summer, Wet, Dry, Monsoon, Autumn, Early Winter, Late Winter, Prevernal, Vernal, Estival, Serotinal, Autumnal, and Hibernal. Additionally or alternatively, seasons may be defined based on climate thresholds. For example, spring may be defined by the chance of freezing temperatures (e.g., frost conditions) occurring being below 20%.

In other embodiments, edible plants may be updated based on production/usage, as opposed to seasonally. In certain embodiments, the propagation trays including edible plants may have been started in greenhouse environment, prior to installation in a subscriber's vertical growing system. For example, plants may be transferred using propagation trays to a vertical growing system once they have entered a productive (e.g., fruiting) stage. Subsequently, depleted/inactive plants may be rotated out of the vertical growing system. For example, they may be stored by the subscription operator, until the plants are ready (e.g., regrown, in a productive stage) to be reinstalled with a subscriber.

A method is provided to update the configuration of the vertical growing system, including selecting and installing the replacement propagation trays. Overall, an updated configuration is selected based on a stored previous configuration of the vertical growing system. Subscriber preferences (e.g., decorative plants, edible plants) may further be used to select the updated configuration. The capability to update the configuration of the vertical growing system is facilitated by combining the vertical growing system design (e.g., propagation trays inside mounting trays) with the method for generating new configurations.

The method includes receiving a request for an updated configuration of the vertical growing system. In one suitable embodiment, a subscriber of the vertical growing system generates the request. For example, the subscriber may use an automated phone system or website to input a request for an updated configuration of the vertical growing system. In another suitable embodiment, requests are automatically generated based on stored schedules, which may be set by the subscriber or predefined by the provider of the vertical growing system. For example, requests may be generated monthly, quarterly, seasonally, and the like. The request may include an identifier of the vertical growing system, such as a serial number or subscription number.

In response to the request, the method includes retrieving a first configuration, or existing configuration, of the vertical growing system from a database. In other words, a first configuration may be retrieved as a basis for generating the second configuration. In one suitable embodiment, the request for an updated configuration includes a serial number, and the database is queried with the serial number. The first configuration may include the number of mounting trays, the dimensions of the mounting trays, the style of propagation tray currently installed in each mounting tray, and the like.

For example, as shown in FIG. 14, the first configuration may define a vertical growing system (e.g., vertical growing system 300) having 5 mounting trays (e.g., mounting trays 304) in a vertical configuration. Further, each mounting tray has eight troughs (e.g., can accommodate a propagation tray with a maximum of eight chambers), as shown in FIG. 14.

FIG. 6 illustrates a configuration where mounting tray 104 has four troughs 184 and receives propagation tray 176 having four chambers 180.

The first configuration may further define the propagation trays currently installed. More specifically, the first configuration may define any combination of, plant types, propagation medium types, and plant age. For example, the first configuration may define that a first (e.g., uppermost) mounting tray contains eight mature tulip bulbs in soil, and the second mounting tray contains 4 ten week old conifers, and 4 twenty week old conifers, all in mineral wool growing medium.

More specifically, a computer system is provided to store the configurations of vertical growing systems (e.g., the first configuration), store inventory listings of propagation trays, and generate updated configurations of vertical growing systems. The initial configuration includes a frame assembly, any number of mounting trays, and a first set of propagation trays. For example, a subscriber may select an initial configuration including eight mounting trays in a frame assembly, and eight propagation trays including dwarf conifers. Further, the propagation trays may have chambers configured to be inserted into troughs of the mounting trays. For example, propagation trays having eight chambers may be selected for a vertical growing system including mounting trays having eight troughs. In some embodiments, a subscriber may further be able to select multiple propagation trays to fill a single mounting tray. As another example, two propagation trays each having four chambers may be selected to fill a mounting tray having eight troughs.

The first configuration may be an initial configuration of the vertical growing system. Subscribers may define (e.g., using a website, by phone) an initial first configuration of the vertical system. For example, a subscriber may define an initial configuration including a number of vertical growing system frame assemblies, a number of mounting trays per frame assembly, and a mounting tray size. The frame assembly and mounting trays may be provided with the first set of propagation trays.

After the first configuration is retrieved, the method includes retrieving an inventory listing from the database. The inventory listing is used to select propagation trays to form the second (new) configuration of the vertical growing system. The inventory listing includes propagation trays eligible for installation into vertical growing systems. The inventory listing further includes, in an example embodiment, plant type, propagation medium type, plant age/maturity, and propagation tray size (e.g., 8 chambers, 4 chambers). The inventory listing may further include pricing data, inventory location data, plant flowering data, and the like.

The method includes generating a second configuration for the vertical growing system based on the inventory listing and first configuration. Generally, the first configuration defines the capacity of the vertical growing system, and propagation trays are selected from the inventory listing for installation. Multiple methodologies for generating the second configuration are contemplated.

In one suitable embodiment, where the vertical growing system is refreshed seasonally, the first configuration includes conifers (e.g., winter seasonal plants), and a second configuration is generated including tulips (e.g., spring seasonal plants) is generated. The tulips are selected from the inventory, to match their relatively limited flowering period with installation into the vertical growing system, such that the display of tulip flowers in the vertical growing system is optimized. In another suitable embodiment, where the vertical growing includes edible plants, propagation trays including mature plants ready to enter a productive (e.g., fruiting) stage may be selected, to maximize productivity while installed in a subscriber's vertical growing system.

In another suitable embodiment, the vertical growing system is refreshed based on plant growth, directing the selection of the second configuration. For example, dwarf conifers may be suitable for installation in a vertical growing system for only a two year period. In response to a first configuration including conifers aged two years, a second configuration may be generated including conifers from the inventory listing with a maximum age of six months. Updating configurations based on plant growth may prevent plants from overgrowing their propagation medium. In another suitable example, basil plants may be started from seeds in a high density configuration, before being transferred to a lower density vertical growing system designed for productive growth. In an even further example, almond trees may be transferred to a vertical growing system configured to accommodate larger root systems.

The new second set of propagation trays (e.g., the second configuration) may be automatically selected. For example, seasonal plants may be selected. Alternatively, the second set of propagation trays may selected based on plants requested by the subscriber. The subscriber may request a specific configuration of propagation trays. In one suitable example, the subscriber selects one propagation tray of bell peppers, and one tray of poblano peppers. In another suitable example, the subscriber selects one tray of assorted flowing plants, and one tray of conifers. In yet another suitable example, the subscriber selects a propagation tray including plants (e.g., chrysanthemums) dyed to a specific color. Additionally, the subscriber may specify the propagation medium to be included with the propagation trays, such as soil or soilless mediums (e.g., mineral wool).

The second configuration may include propagation trays from the first configuration. For example, the vertical growing system may include propagation trays housing poblano peppers and tarragon. At the end of the growing season of the peppers, the configuration of the vertical growing system may be updated to replace the peppers with cauliflower while maintaining the tarragon. More specifically, a subset of the propagation trays (those containing peppers) may be replaced, while leaving the tarragon containing propagation trays mounted.

The method includes generating an order, including instructions to remove the first configuration, and install the second configuration. The order may further include stock numbers of propagation trays in inventory, and quantities. In some embodiments, the order includes shipping instructions to deliver the second configuration of propagation trays to an operator of the vertical growing system. In other embodiments, installation of the second configuration may be scheduled with an installer and the operator of the vertical growing system. The method further includes removing a first set of propagation trays from mounting trays of the vertical growing system and installing a second set of propagation trays into the mounting trays of the vertical growing system.

The method further includes installing/delivering the second configuration of the vertical growing system. Configurations of the vertical growing systems (e.g., new propagation trays) may be delivered via a parcel service for the subscriber to install. Additionally or alternatively, an installer may install the propagation trays. In other embodiments, subscribers may pick up propagation trays from a greenhouse, or other facility.

The propagation trays removed from the vertical growing system may be transported (e.g., shipped, transported by the installer, dropped off by a subscriber) back to a greenhouse or nursery facility. For example, propagation trays may be stored until the next productive/flowering season of the included plants. As another example, plants may be transplanted from the propagation trays to a traditional planting environment. As yet another example, the plants may be composted/disposed.

Figure 32:
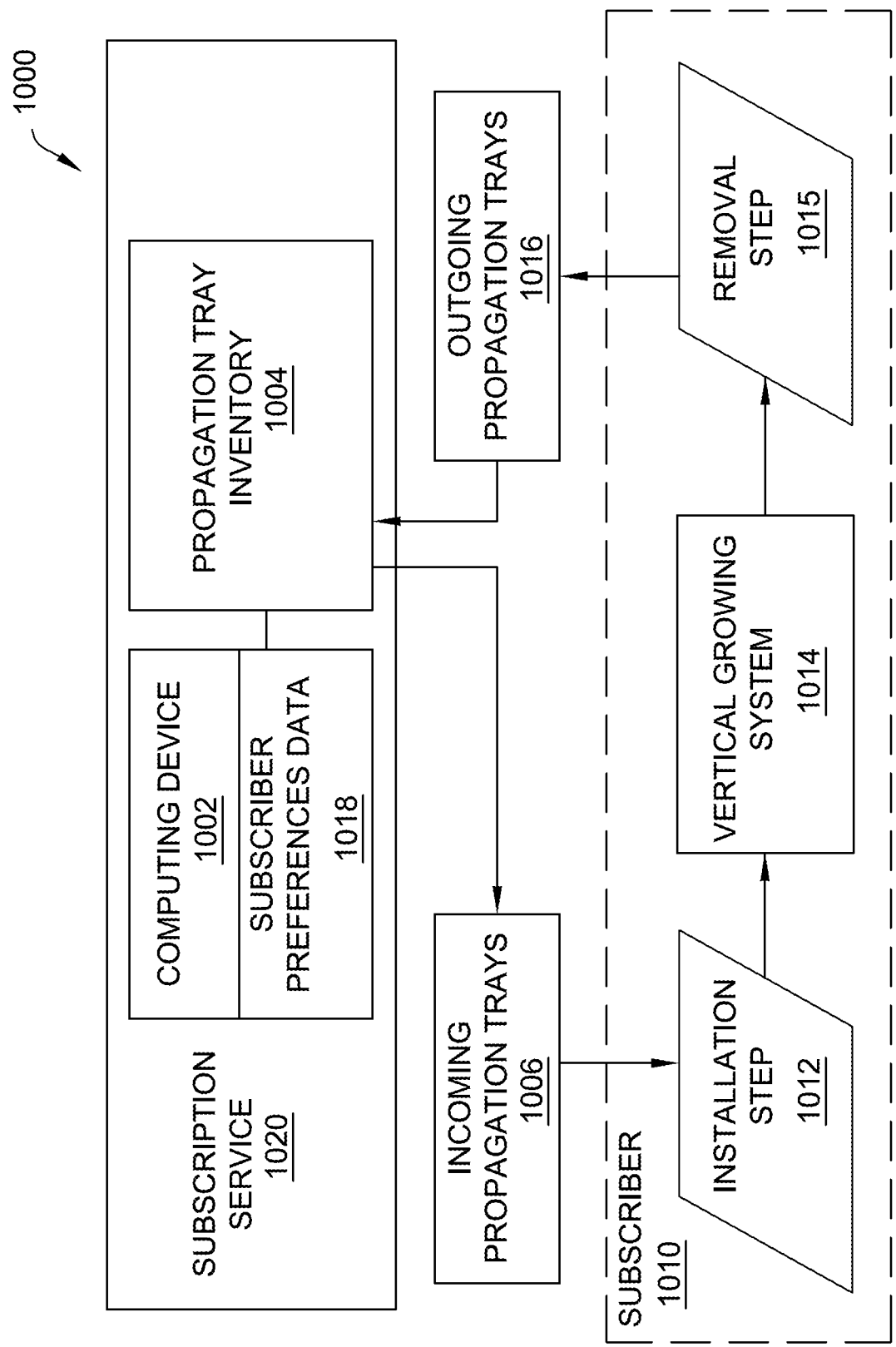
FIG. 32 is a block diagram of one suitable embodiment of a system for updating the configuration of a vertical growing system of the present disclosure.

FIG. 32 is a block diagram of one suitable embodiment of a system for updating the configuration of a vertical growing system of the present disclosure. The system 1000 includes a subscription service 1020 and a subscriber 1010. The subscription service 1020 includes, at least, a computing device 1002 and a propagation tray inventory 1004. The computing device 1002 is configured to receive requests for updated configurations of vertical growing systems (e.g., periodically, on-demand), and generate configurations (e.g., sets of propagation trays) for vertical growing systems based on the inventory 1004 and subscriber preferences data 1018. The configuration of subscriber vertical growing systems (e.g. the vertical growing system 1014), propagation tray inventory listings, and subscriber preferences may be stored in a database.

The propagation tray inventory 1004 may include any number of propagation trays. Propagation trays have multiple chambers, as shown in FIG. 6, housing propagation medium and plants. For example, and without limitation, in some embodiments, the propagation tray inventory 1004 may include propagation trays having seasonal plants, such that plants may be distributed from inventory as seasonally appropriate.

In some embodiments, the propagation tray inventory 1004 may be a commercial nursery provider. In particular, in such embodiments, a third party supplier-subscriber may pay a fee to the subscription service 1020 to receive orders from subscribers 1010. The subscription service may then place orders with the third party supplier subscribers for the subscribers 1010 as described above. For example, in such embodiments the subscription service 1020 may coordinate with local nursery providers to provide and/or deliver propagation trays, to coordinate providing the desired plants to the subscriber 1010.

The propagation tray inventory 1004 may be made up of a variety of propagation trays. For example, in at least some embodiments, the subscriber may request seasonally appropriate plants for the vertical growing system 1014. In such embodiments, the computing device 1002 selects the incoming propagation trays 1006 from the propagation tray inventory 1004 to generate a new and seasonally appropriate configuration for the vertical growing system 1014. The computing device 1002 may generate the new configuration based on a pre-set schedule, in response to a request from the subscriber 1010, or based on weather conditions. In one suitable embodiment, the computing device 1002 may receive a request for a spring configuration, and select the incoming propagation trays 1006 including tulip bulbs from inventory 1004. Additionally, the computing device 1002 may retrieve specifications of the subscriber's vertical growing system 1014 from a database, as shown in FIG. 32, to select propagation trays from the propagation tray inventory 1004 that fit the subscriber's vertical growing system 1014.

For example, the propagation trays may be selected based on a number of chambers per propagation tray, and chamber size.

The computing device 1002 stores the subscriber preferences data 1018. The incoming propagation trays 1006 may further be selected based on this subscriber preferences data 1018. The subscriber preferences data 1018 may include edible plant preferences, decorative plant preferences, propagation medium preferences, and the like. The subscriber preferences data 1018 may be received from the subscriber 1010. For example, the subscriber preferences data 1018 may be received from the subscriber 1010 using a website provided by computing device 1002.

After the incoming propagation trays 1006 have been selected by the computing device 1002, they may be delivered to the subscriber 1010. In one suitable embodiment, the subscription service 1020 delivers the incoming propagation trays 1006 to the subscriber 1010 using a parcel delivery service. In another suitable embodiment, the subscription service 1020 provides an additional installation service and further contacts the subscriber 1010 to coordinate installation of the incoming propagation trays 1006 by an installer/distributor.

The vertical growing system 1014 is configured such that propagation trays may easily be installed/removed from the mounting trays of the vertical growing system 1014. The outgoing propagation trays 1016 are removed from vertical growing system 1014 and replaced with the incoming propagation trays 1006. For example, in at least some suitable embodiments, the subscriber 1010 may request seasonal plant updates. At the removal step 1015, the outgoing propagation trays 1016, including dwarf conifers, are removed from vertical growing system 1014 at the end of winter. At the installation step 1012, the incoming propagation trays 1006, including tulip bulbs, are installed in vertical growing system 1014. The vertical growing system 1014 is configured such that the installation step 1012 can proceed shortly after the removal step 1015. In other words, the propagation trays may be swapped in any order.

The outgoing propagation trays 1016 may be subsequently returned to the propagation tray inventory 1004. For example, they may be stored until next season, or replanted in another environment. For example, propagation trays may be stored until the next productive/flowering season of the included plants. As another example, plants may be transplanted from the propagation trays to a traditional planting environment. As yet another example, the plants may be composted/disposed.

Figure 33:
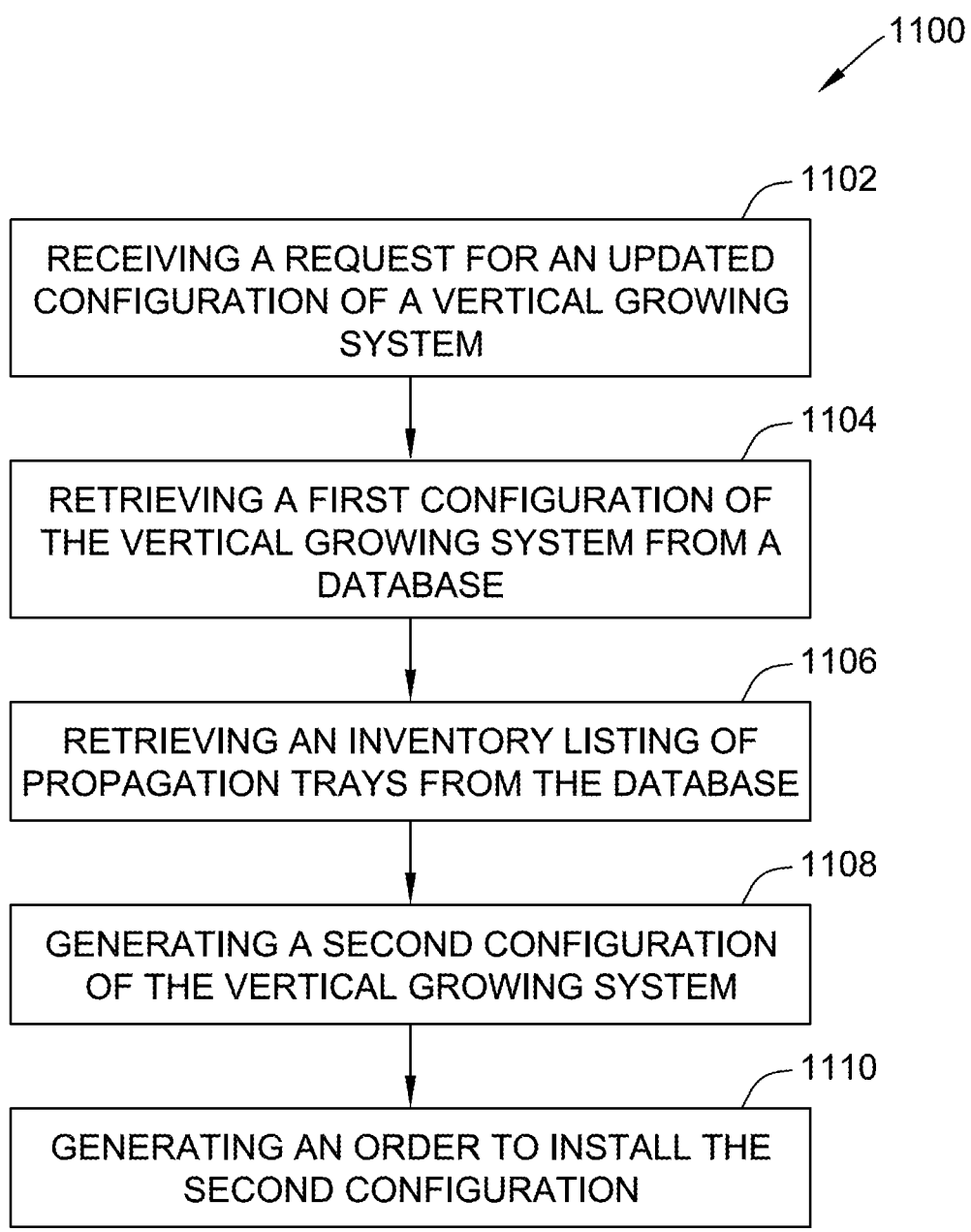
FIG. 33 is a flowchart illustrating an example process for use with the system shown in FIG. 28.

FIG. 33 is a flowchart illustrating an example process for use with the system shown in FIG. 32. The method 1100 is provided to manage the configuration of vertical growing systems. New configurations of the vertical growing system may be generated to adapt to seasonal conditions, and/or maximize food production. For example, plants may be stored in inventory until they reach a productive stage, at which point they may be installed into a subscriber's vertical growing system. As another example, plants may be removed from the vertical growing system when they are depleted or outgrow the propagation trays.

The method 1100 includes receiving 1102 a request for an updated configuration the vertical growing system. Receiving 1102 may include receiving a request from a subscriber. For example, a subscriber may have depleted culinary herbs housed in the vertical growing system. Receiving 1102 may further include automatically generated periodic requests for updated configurations. In other words, requests for an updated configuration may be automatically generated based on a preset schedule. For example, updated configurations may be generated seasonally such that a subscriber's vertical growing system continually includes seasonally appropriate plants.

The method 1100 further includes retrieving 1104 a first configuration of the vertical growing system from a database. The first configuration includes a 'current state' of the vertical growing system, including currently installed propagation trays, and the specifications of the vertical growing system. More specifically, the first configuration may include the number of mounting trays, the number of chambers per mounting tray, and the size of chambers accepted by the mounting trays. The first configuration may be retrieved from the database based on a subscriber or vertical growing system identifier.

The method 1100 further includes retrieving 1106 an inventory listing of propagation trays from the database, and generating 1108 a second configuration of the vertical growing system. For example, propagation trays currently stored in a greenhouse may be retrieved, before generating the second configuration. Generating 1108 may include filtering the inventory listing to select propagation trays compatible (e.g., having the same type of propagation tray) with the vertical growing system and/or having mature plants. Additionally, generating 1108 may include selecting propagation trays based on subscriber preferences, such as type of plant (e.g., fruiting, flowering).

In one suitable embodiment, in response to a subscriber request for spring plants, generating 1108 includes selecting propagation trays having tulip bulbs from inventory. More specifically, generating 1108 may include selecting a number of tulip propagation trays equaling the number of mounting trays in the vertical growing system, where the number of chambers of each propagation tray further matches the mounting trays. In certain embodiments, the size and shape of propagation trays and included chambers may be checked for compatibility with the mounting trays.

The method 1100 further includes generating 1110 and order to install the second configuration. In one suitable embodiment, the order includes instructions to select propagation trays from inventory and deliver them using a parcel service to a subscriber/operator of the vertical growing system. In an alternate suitable embodiment, the order includes instructions to an installer, directing the installer to retrieve the selected propagation trays form inventory and install them into the subscriber's vertical growing system.

Figure 34:
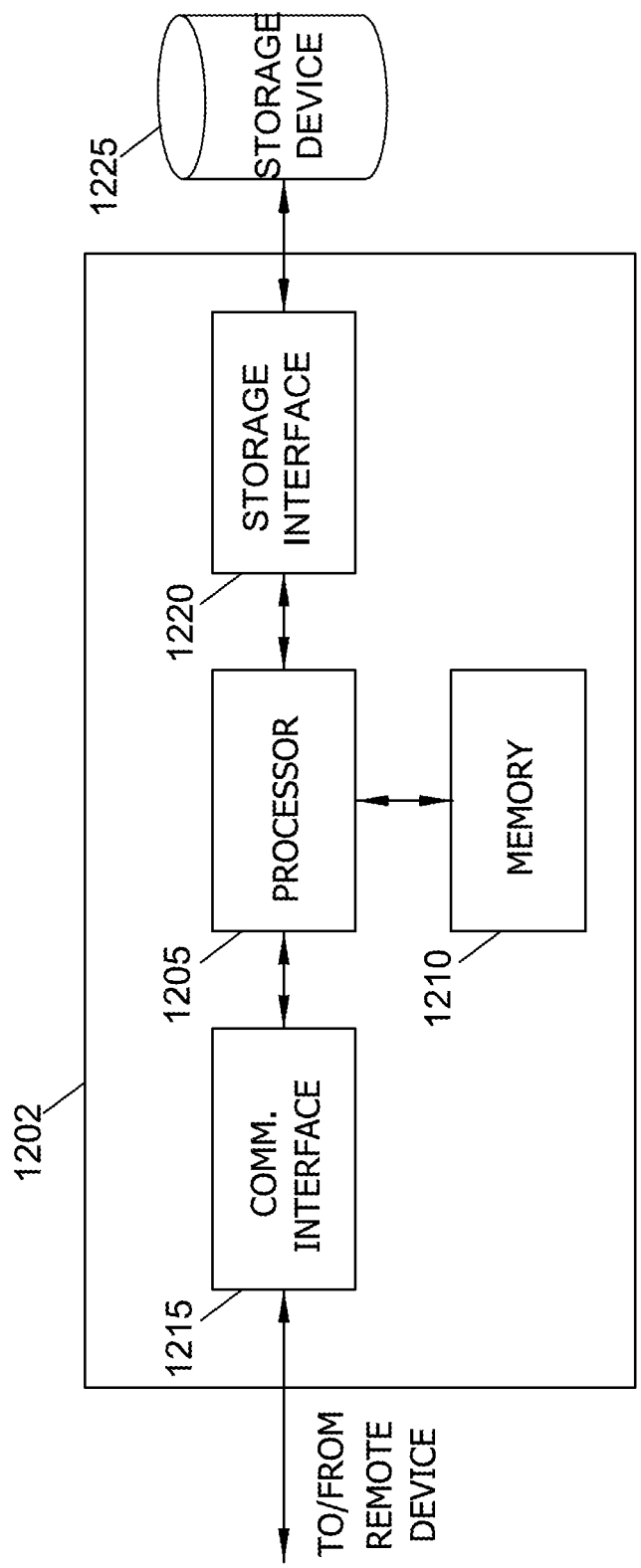
FIG. 34 illustrates an example configuration of a computing device that may be used with the system shown in FIG. 28.

FIG. 34 depicts an exemplary configuration of a computing device 1202. For example, the computing device 1202 may track the propagation tray inventory 1004, as shown in FIG. 32. The computing device 1202 may include a processor 1205 for executing instructions. Instructions may be stored in a memory area 1210, for example. The processor 1205 may include one or more processing units (e.g., in a multi-core configuration).

The processor 1205 may be operatively coupled to a first communication (i.e., network) interface 1215 such that the computing device 1202 may be capable of communicating with a remote device. In some embodiments, the communication interface 1215 may be a virtual interface. In certain embodiments, the communication interface 1215 is associated with a network address, such as an IP address. In other embodiments, the communication interface 1215 is associated with physical network links. For example, the communication interface 1215 may receive network packets from a user computing device via Ethernet, using a switching device.

The processor 1205 may also be operatively coupled to a storage device 1225. The storage device 1225 may be any computer-operated hardware suitable for storing and/or retrieving data. In some embodiments, the storage device 1225 may be integrated in the computing device 1202. For example, the computing device 1202 may include one or more hard disk drives as the storage device 1225. In other embodiments, the storage device 1225 may be external to the computing device 1202 and may be accessed by a plurality of host computing devices 1202. For example, the storage device 1225 may include multiple storage units such as hard disks or solid state disks in a redundant array of inexpensive disks (RAID) configuration. The storage device 1225 may include a storage area network (SAN) and/or a network attached storage (NAS) system.

In some embodiments, the processor 1205 may be operatively coupled to the storage device 1225 via a storage interface 1220. The storage interface 1220 may be any component capable of providing the processor 1205 with access to the storage device 1225. The storage interface 1220 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1205 with access to the storage device 1225.

Memory areas 1210 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

In one suitable embodiment, a method of updating the configuration of the vertical growing system is provided. The method includes: receiving a request for an updated configuration of a vertical growing system, retrieving a first configuration of the vertical growing system from a database, wherein the first configuration includes a first set of propagation trays, retrieving an inventory listing of propagation from the database, generating a second configuration of the vertical growing system from a database, wherein the second configuration includes a second set of propagation trays, removing the first set of propagation trays from mounting trays of the vertical growing system, and installing the second set of propagation trays into the mounting trays of the vertical growing system.

In some embodiments, the method further includes determining the first set of propagation trays includes a first type of plant, and the first set of propagation trays is depleted, and selecting the second set of propagation trays from the inventory listing such that the second set of propagation trays includes the first type of plant. The method may also include determining the first set of propagation trays includes a first seasonal type of plant, and selecting the second set of propagation trays from the inventory listing such that the second set of propagation trays includes a second seasonal type of plant. In certain embodiments, the method includes determining a subscriber associated with the vertical growing system, retrieving edible plant preferences from the database based on the determined subscriber, and selecting the second set of propagation trays from the inventory based on: (i) plant maturity, and (ii) edible plant preferences of the subscriber. More specifically, the method may also include receiving edible plant preferences from the subscriber, storing the edible plant preferences in the database. In other embodiments, the method includes determining the first set of propagation trays includes depleted perennial plants, and appending the first set of propagation trays to the inventory listing in the database, wherein the inventory listing includes a perennial status of the first set of propagation trays.

In another suitable embodiment, a computing device comprising a processor and a memory in communication with the processor is provided. The processor is programmed to: receive a request for an updated configuration of the vertical growing system, retrieve a first configuration of the vertical growing system from a database, wherein the first configuration includes a first set of propagation trays, retrieve an inventory listing of propagation from the database, generate a second configuration of the vertical growing system from a database, wherein the second configuration includes a second set of propagation trays, and generate an order. The order includes instructions to remove the first set of propagation trays from mounting trays of the vertical growing system, and install the second set of propagation trays into the mounting trays of the vertical growing system.

The processor may be further programmed to determine the first set of propagation trays includes a first type of plant, and the first set of propagation trays is depleted, and select the second set of propagation trays from the inventory listing such that the second set of propagation trays includes the first type of plant. The processor may also be programmed to determine the first set of propagation trays includes a first seasonal type of plant, select the second set of propagation trays from the inventory listing such that the second set of propagation trays includes a second seasonal type of plant. In other embodiments, the processor is programmed to determine a subscriber associated with the vertical growing system, retrieve edible plant preferences from the database based on the determined subscriber, and select the second set of propagation trays from the inventory based on: (i) plant maturity, and (ii) edible plant preferences of the subscriber. More specifically, the processor may be programmed to receive edible plant preferences from the subscriber, and store the edible plant preferences in the database. In yet other embodiments, the processor is programmed to determine the first set of propagation trays includes depleted perennial plants, append the first set of propagation trays to the inventory listing in the database, wherein the inventory listing includes a perennial status of the first set of propagation trays.

When introducing elements of the present invention or the preferred embodiment(s) thereof, the articles "a", "an", "the", and "said" are intended to mean that there are one or more of the elements. The terms "comprising," "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:
1. A vertical growing system comprising:
   a frame assembly extending above a base surface, the frame assembly including a support grid defining a longitudinal axis;
   a propagation tray including a chamber for holding a plant therein;

a mounting tray removably attached to the frame assembly, the mounting tray including a curved interior surface sized to receive at least a portion of the propagation tray therein; and a positioning member including a fin fixed to the propagation tray, the fin sized to extend between the interior surface of the mounting tray and the propagation tray when the propagation tray is received within the mounting tray, the fin including a curved edge shaped complimentary to the curved interior surface of the mounting tray and to orient the chamber at a first oblique angle relative to the longitudinal axis of the support grid.

2. The vertical growing system of claim 1, wherein the frame assembly includes a wire grid having a plurality of transversely extending wires.

3. The vertical growing system of claim 1, wherein the propagation tray includes a generally planar top face, the chamber extending obliquely from the top face, and wherein the top face is oriented transversely relative to the longitudinal axis of the support grid when the propagation tray is received within the mounting tray.

4. The vertical growing system of claim 3, wherein the curved edge is configured to contact the mounting tray and support the propagation tray within the mounting tray when the propagation tray is received within the mounting tray.

5. The vertical growing system of claim 1, wherein the propagation tray further includes an additional chamber and a generally planar top face extending around both the chamber and the additional chamber.

6. The vertical growing system of claim 5, wherein the chamber and the additional chamber each extend obliquely from the top face, and wherein the top face is oriented transversely relative to the longitudinal axis of the support grid when the propagation tray is received within the mounting tray.

7. The vertical growing system of claim 5, wherein the top face extends laterally between a first end and a second end of the propagation tray, and wherein the propagation tray further includes a first end fin positioned at the first end, the first end fin including a curved edge shaped complimentary to the curved interior surface of the mounting tray.

8. The vertical growing system of claim 7, wherein the propagation tray further includes a second end fin positioned at the second end, the second end fin including a curved edge shaped complimentary to the curved interior surface of the mounting tray.

9. A vertical growing system comprising:
a frame assembly extending above a base surface and including a support grid defining a longitudinal axis, the support grid including a first support member and a second support member, the first and second support members each transversely oriented relative to the longitudinal axis;
a plurality of mounting trays removably attached to the frame assembly above the base surface, the plurality of mounting trays being arranged in a plurality of vertically stacked rows along the support grid, each mounting tray including a curved interior surface; and
a plurality of propagation trays, each propagation tray of the plurality of propagation trays including a first chamber configured for supporting a plant therein and a positioning member, the positioning member including a fin fixed to the propagation tray, the fin including a curved edge shaped complimentary to the curved interior surface of a first mounting tray, wherein the first chamber of a first propagation tray of the plurality of propagation trays is received within the first mounting tray such that the fin extends to the first mounting tray and orients the first chamber of the first propagation tray at a second an oblique angle relative to the longitudinal axis.

10. The vertical growing system of claim 9, wherein the each propagation tray of the plurality of propagation trays are oriented at the oblique angle relative to the longitudinal axis.

11. The vertical growing system of claim 9, wherein the each propagation tray of the plurality of propagation trays further includes a second chamber configured for supporting a plant therein.

12. The vertical growing system of claim 11, wherein the second chamber of the first propagation tray is received within a second mounting tray of the plurality of mounting trays.

13. The vertical growing system of claim 12, wherein the second chamber of the first propagation tray is oriented at the second oblique angle relative to the longitudinal axis.

14. The vertical growing system of claim 9, wherein each mounting tray of the plurality of mounting trays is configured to receive propagation trays of different sizes therein.

15. A method of assembling a vertical growing system, the method comprising:
positioning a frame assembly to extend above a base surface, the frame assembly including a support grid defining a longitudinal axis;
providing a mounting tray including a curved interior surface sized to receive at least a portion of a propagation tray therein;
attaching the mounting tray to the frame assembly;
providing a propagation tray including a chamber for holding a plant therein; and
positioning the propagation tray, at least in part, within the mounting tray such that a positioning member extends between the interior surface of the mounting tray and the propagation tray, the positioning member including a fin fixed to the propagation tray orienting a chamber of the propagation tray at a first oblique angle relative to the longitudinal axis, when the mounting tray is attached to the frame assembly and the propagation tray is positioned within the mounting tray.

16. The method of claim 15 further comprising:
providing an additional mounting tray; and
attaching the additional mounting tray to the frame assembly in a vertically stacked configuration relative to the mounting tray.

* * * * *